(12) United States Patent
Takahashi et al.

(10) Patent No.: US 8,485,385 B2
(45) Date of Patent: Jul. 16, 2013

(54) WELDING MATERIAL AND FUEL TANK THEREBY WELDED

(75) Inventors: Kei Takahashi, Kawasaki (JP); Fumio Asada, Kawasaki (JP); Haruo Ikeda, Kawasaki (JP); Osamu Miyachi, Kawasaki (JP)

(73) Assignee: Japan Polyethylene Corporation, Tokyo (JP)

( * ) Notice: Subject to any disclaimer, the term of this patent is extended or adjusted under 35 U.S.C. 154(b) by 795 days.

(21) Appl. No.: 11/778,417

(22) Filed: Jul. 16, 2007

(65) Prior Publication Data

US 2008/0021158 A1 Jan. 24, 2008

(30) Foreign Application Priority Data

Jul. 21, 2006 (JP) ................. 2006-199087
Jul. 21, 2006 (JP) ................. 2006-199093

(51) Int. Cl.
C08L 23/04 (2006.01)
C08L 51/00 (2006.01)
C08L 23/26 (2006.01)
B65D 1/00 (2006.01)
C09J 123/04 (2006.01)
C09J 123/26 (2006.01)

(52) U.S. Cl.
USPC ............... 220/562; 220/567.2; 220/62.11; 220/694; 525/70; 525/74

(58) Field of Classification Search
USPC .............. 525/70, 74; 220/562, 567.2, 62.11, 220/694
See application file for complete search history.

(56) References Cited

U.S. PATENT DOCUMENTS

| | | | |
|---|---|---|---|
| 5,643,997 A | 7/1997 | Matsuoka et al. | |
| 5,902,655 A | 5/1999 | Matsuoka et al. | |
| 6,398,059 B1 | 6/2002 | Hayashi et al. | |
| 6,645,588 B1 * | 11/2003 | Leiden et al. | ............... 428/35.8 |
| 2003/0037831 A1 | 2/2003 | Nakamura et al. | |
| 2006/0099365 A1 | 5/2006 | Sasai et al. | |
| 2006/0213915 A1 | 9/2006 | Quintman et al. | |

FOREIGN PATENT DOCUMENTS

| | | |
|---|---|---|
| EP | 1 241 229 B1 | 1/2004 |
| EP | 1 705 052 A2 | 9/2006 |
| JP | 2000-8981 | 1/2000 |
| JP | 2002-264669 | 9/2002 |
| JP | 2002-370759 | 12/2002 |
| JP | 2003-72399 | 3/2003 |
| JP | 2003-246028 | 9/2003 |
| JP | 2004-293324 | 10/2004 |
| JP | 2005-193650 | 7/2005 |
| JP | 2006-176717 | 7/2006 |
| JP | 2006-176718 | 7/2006 |
| JP | 2007-8968 | 1/2007 |
| WO | WO 02/079323 A1 | 10/2002 |
| WO | WO 03/018699 A2 | 3/2003 |

OTHER PUBLICATIONS

Ibayashi, STN Abstract 2005:1220403, (Nov. 2005).*
Nozaki, STN Abstract 2000:62652, (Jan. 2000).*
Ibayashi, electronic tranlstion of JP 2005-320526, (Nov. 2005).*
Nozaki, electronic translation of JP 2000-026533, (Jan. 2000).*

* cited by examiner

*Primary Examiner* — Jeffrey Mullis
(74) *Attorney, Agent, or Firm* — Oblon, Spivak, McClelland, Maier & Neustadt, L.L.P.

(57) ABSTRACT

A welding material, comprising a modified polyethylene resin composition (Z) comprising from 0.5 to 95 wt % of a modified polyethylene resin (X) having at least one monomer selected from the group consisting of an unsaturated carboxylic acid and its derivative, grafted to a polyethylene resin (A) having a density of from 0.910 to 0.965 g/cm$^3$ and a MFR (temperature: 190° C., load: 2.16 kg) of from 0.1 to 5.0 g/10 min, and from 5 to 99.5 wt % of an unmodified polyethylene resin (Y) having a density of from 0.930 to 0.965 g/cm$^3$, a MFR of from 0.01 to 5.0 g/10 min and a melt flow rate ratio (HL-MFR (temperature: 190° C., load: 21.6 kg)/MFR of from 40 to 270, and having a density of from 0.938 to 0.965 g/cm$^3$ and a MFR of from 0.05 to 1.0 g/10 min.

19 Claims, No Drawings

WELDING MATERIAL AND FUEL TANK THEREBY WELDED

BACKGROUND OF THE INVENTION

1. Field of the Invention

The present invention relates to a welding material and a fuel tank thereby welded. More particularly, it relates to a welding material employing a specific modified polyethylene resin composition which is excellent in adhesion to polyethylene resins, various polyamide (PA) resins such as nylon 6,6, various hydroxyl group-containing resins such as an ethylene/vinyl alcohol copolymer (EVOH), various polyester resins such as polyethylene terephthalate (PET) and polybutylene terephthalate (PBT), various engineering plastics such as polyacetal (POM), polyphenylene ether (PPE) and polyphenylene sulfide (PPS), various metals such as iron, aluminum, copper and tin, and various alloys, and a fuel tank thereby welded.

2. Discussion of Background

In recent years, various components of automobiles have been made of plastic and practically used for the purpose of weight reduction. Among them, a fuel tank is a large size component, and if it is made of plastic, such will contribute to weight reduction of the vehicle itself. Accordingly, a fuel tank is now being changed from one made of metal to one made of plastic (the following description will be made mainly with respect to a plastic fuel tank).

Such a plastic tank has a multilayered structure having a fuel permeation-preventing layer made of e.g. a polyamide resin (hereinafter referred to as PA) or an ethylene/vinyl alcohol copolymer (hereinafter referred to as EVOH) sandwiched between outer and inner layers made of e.g. a high density polyethylene resin. However, the high density polyethylene resin is poor in adhesion to PA or EVOH, and accordingly, it is common to employ a polyethylene resin modified with an unsaturated carboxylic acid such as maleic anhydride to bond the outer and inner layers to PA or EVOH.

The present applicant et al. have proposed such a plastic fuel tank employing e.g. a high density polyethylene resin, EVOH and a modified polyethylene resin, and an adhesive resin composition useful therefor, for example, in WO2002079323A1 (Japan Polyolefins Co., Ltd.), U.S. Pat. No. 5,643,997 (Showa Denko), U.S. Pat. No. 5,902,655 (Showa Denko), JP-A-2006-176717 (Japan Polyethylene Corporation) and JP-A-2006-176718 (Japan Polyethylene Corporation).

Further, also in JP-A-2002-264669 (TI Group), a fuel tank having a structure comprising a high density polyethylene layer, a binder layer and an EVOH layer has been proposed.

Further, to a plastic fuel tank body, it is necessary to attach various attachments such as a fuel cut-off valve, a fuel vapor recovery valve, a fuel shut-off valve, a valve cover, a connector, a pipe joint, a fuel line and a fuel sender. Such various attachments are made of a polyamide resin, a polyacetal resin, etc. and thus are poor in adhesion or weldability to a fuel tank body made of a high density polyethylene. Accordingly, at the joint area, a modified polyolefin resin will be disposed. Further, various proposals have been made to prevent fuel diffusion by providing a material (a barrier material) having a fuel permeation preventing property, such as a polyamide resin or an ethylene/vinyl alcohol copolymer to cover the modified polyolefin resin disposed at the joint area between the attachment and the fuel tank (e.g. JP-A-2000-008981 (Toyoda Gosei), JP-A-2002-370759 (Ube Kosan), JP-A-2003-072399 (Kyosan Denki), JP-A-2004-293324 (Toyoda Gosei), JP-A-2003-246028 (Ube Kosan) which corresponds to USP 20030037831, and JP-A-2005-193650 (Biolax)).

Thus, to a plastic fuel tank body or to an attachment such as a fuel sender itself, it is possible to impart a fuel permeation preventing property to some extent by including a resin layer having a barrier property in such a multilayer structure.

However, diffusion of a fuel occurs also from the joint portion (the welded portion) of the tank and the attachment, and such fuel diffusion from the joint portion (the welded portion) tends to be a non-negligible amount. Accordingly, in order to reduce the fuel diffusion amount from the entire tank portion, it is necessary to lower the fuel permeation amount from this joint portion.

However, it is widely known that as a general nature of a polyethylene resin, as the density becomes high, the stress cracking resistance or creep rupture resistance tends to deteriorate, and such a tendency is in opposite correlation with the above-mentioned fuel permeation preventing performance. Besides, a direct fuel-injection engine-mounted car has a system wherein a part of the fuel returns to the tank, whereby the fuel temperature in the tank may rise to a level of from 60 to 80° C., and accordingly, each of the stress cracking resistance, creep rupture resistance and fuel permeation preventing performance of the polyethylene resin tends to be accelerated towards deterioration. Further, when contacted with gasoline or gasohol, the polyethylene layer and the adhesive layer tend to swell, whereby the interlaminar bond strength between the polyethylene layer and the polyamide layer tends to deteriorate, thus leading to a problem such as delamination or cracking.

Accordingly, in order to utilize such a material as a constituting material for a component for a fuel tank, as an important safety component, it can hardly be said to have a sufficient performance secured from the viewpoint of safety.

Further, a modified polyolefin resin to be used at the joint surface, is required to have a firm bond strength to a material (barrier material) having a fuel permeation preventing performance such as a polyamide resin or an ethylene/vinyl alcohol copolymer, and a firm welded (fused) strength to the resin of the tank body, and further desired to be a balanced material to sufficiently satisfy various performances such as fuel permeation preventing performance and creep rupture resistance (long-term performance). However, the above-mentioned conventional modified polyethylene resins or welding materials did not fully satisfy such performances.

SUMMARY OF THE INVENTION

In view of the above problems, the welding material of the present invention is not only capable of maintaining a good fuel permeation-preventing property even when used for a long period of time in a high temperature atmosphere, but also excellent in creep rupture resistance, stress cracking resistance (long-term performance) and firm bond strength to a barrier material. Further, by using such a welding material as a welding material constituting an attachment such as a fuel sender attached to a fuel tank, it is readily weldable to the fuel tank and at the same time, it is possible to suppress fuel diffusion from the joint area with the tank body. Thus, it is an object of the present invention to provide a welding material which is capable of maintaining the bond strength even after being in contact with a fuel such as gasoline or bioethanol, or a gasohol having methanol or ethanol mixed to gasoline, under a severe condition, in an environment where the fuel temperature in the tank rises to from 60 to 80° C., and which is yet excellent in a long-term performance, and to provide a fuel tank thereby welded.

The present inventors have conducted an extensive research to solve the above-mentioned problems, and as a result, have found it possible to maintain the creep rupture resistance (long-term performance) and the fuel-permeation preventing performance which are in an opposite correlation to each other, in good balance without impairing the stress cracking resistance, by selecting a specific modified polyethylene having a relatively high molecular weight and a specific unmodified polyethylene resin having a wide molecular weight distribution to prepare a modified polyethylene resin composition having a high molecular weight and high density, which is useful as a welding material. Further, it has been found that when such a welding material is used as a welding material constituting an attachment such as a fuel sender for a fuel tank, it is easily weldable to the fuel tank and at the same time, it is possible to suppress fuel diffusion from the joint area with the tank body, and yet, it maintains the bond strength even after being in contact with a fuel such as gasoline and yet is excellent in a long-term performance. The present invention has been accomplished on the basis of these discoveries.

Thus, the present invention provides the following:
1. A welding material for a fuel tank, comprising a modified polyethylene resin composition (Z) comprising from 0.5 to 95 wt % of the following modified polyethylene resin (X) and from 5 to 99.5 wt % of the following unmodified polyethylene resin (Y) and having a density of from 0.938 to 0.965 g/cm$^3$ and a melt flow rate (temperature: 190° C., load: 2.16 kg) of from 0.05 to 1.0 g/10 min:
   Modified polyethylene resin (X): A modified polyethylene resin having at least one monomer selected from the group consisting of an unsaturated carboxylic acid and its derivative, grafted to a polyethylene resin (A) having a density of from 0.910 to 0.965 g/cm$^3$ and a melt flow rate (temperature: 190° C., load: 2.16 kg) of from 0.1 to 5.0 g/10 min; and
   Unmodified polyethylene resin (Y): A polyethylene resin having a density of from 0.930 to 0.965 g/cm$^3$, a melt flow rate (temperature: 190° C., load: 2.16 kg) of from 0.01 to 5.0 g/10 min and a melt flow rate ratio (high load melt flow rate HL-MFR (temperature: 190° C., load: 21.6 kg)/melt flow rate MFR (temperature: 190° C., load: 2.16 kg)) of from 40 to 270.
2. The welding material according to the above 1, wherein the fuel tank is made of a multi-layered laminate structure comprising a main layer of a high density polyethylene, an adhesive layer and a barrier layer.
3. The welding material according to the above 1 or 2, wherein the unmodified polyethylene resin (Y) has a melt flow rate ratio (high load melt flow rate HL-MFR (temperature: 190° C., load: 21.6 kg)/melt flow rate MFR (temperature: 190° C., load: 2.16 kg)) of from 70 to 150.
4. The welding material according to any one of the above 1 to 3, wherein the unmodified polyethylene resin (Y) is a polyethylene resin composition comprising from 25 to 60 wt % of a polyethylene resin (B) having a density of from 0.910 to 0.940 g/cm$^3$ and a high load melt flow rate (temperature: 190° C., load: 21.6 kg) of from 0.05 to 10 g/10 min, and from 40 to 75 wt % of a polyethylene resin (C) having a density of from 0.940 to 0.970 g/cm$^3$ and a melt flow rate (temperature: 190° C., load: 2.16 kg) of from 5 to 600 g/10 min.
5. The welding material according to any one of the above 1 to 4, wherein the unmodified polyethylene resin (Y) is a polyethylene resin (Y) produced by multistage polymerization.
6. The welding material according to any one of the above 1 to 5, which further contains at most 150 parts by weight of other polyethylene resin (D) per 100 parts by weight in total of the modified polyethylene resin (X) and the unmodified polyethylene resin (Y).
7. The welding material according to any one of the above 1 to 6, wherein at least one of the modified polyethylene resin (X), the unmodified polyethylene resin (Y) and said other polyethylene resin (D) is produced by a single-site catalyst.
8. The welding material according to any one of the above 1 to 7, wherein the modified polyethylene resin composition (Z) satisfies conditions such that the gasoline permeation rate through a sheet of 1 mm in thickness as measured at 65° C. is at most 50 mg/cm$^2$·24 hr, and the full notch creep rupture time under 5.5 MPa as measured at 80° C. is at least 50 hours.
9. The welding material according to any one of the above 1 to 8, wherein the welding material constitutes a fuel tank attachment.
10. The welding material according to any one of the above 1 to 9, wherein the welding material welds a fuel tank and its attachment together.
11. The welding material according to any one of the above 1 to 10, wherein an at least double-layered laminate structure comprising a layer of the welding material and a layer of a barrier material, constitutes a fuel tank attachment.
12. A fuel tank welded by the welding material as defined in the above 1.
13. The fuel tank according to the above 12, wherein the fuel tank is made of a multi-layered laminate structure comprising a main layer of a high density polyethylene, an adhesive layer and a barrier layer.

By selecting such a specific modified polyethylene resin having a relatively high molecular weight and such a specific unmodified polyethylene resin having a wide molecular weight distribution to prepare the modified polyethylene resin composition having an high molecular weight and a high density within a specific range, which is useful as a welding material, the welding material of the present invention has solved the problem of the fuel permeation-preventing performance and the stress cracking resistance or creep rupture resistance (long-term performance) which are in an opposite correlation to each other, and it is easily weldable to a fuel tank, particularly to a plastic fuel tank and is not only capable of maintaining the good fuel permeation-preventing performance even when used in a high temperature atmosphere for a long period of time, but also excellent in the creep rupture resistance and stress cracking resistance.

Further, by producing the unmodified polyethylene resin (Y) by multistage polymerization, it is possible to easily obtain a polymer having a desired wide molecular weight distribution, whereby it is possible to provide the above welding material having a good balance of performances.

Further, in a case where the welding material is used as a welding material constituting a fuel tank attachment such as a fuel sender for a fuel tank, or in a case where it is used as a welding material wherein an at least double-layered laminate structure comprising a layer of the welding material and a layer of a barrier material, constitutes a fuel tank attachment, it is possible to provide a welding material which is not only capable of maintaining the bond strength but also excellent in the long-term performance even after being in contact with a fuel such as gasoline or bioethanol, or a gasohol, under a severe condition in such an environment that in the case of e.g. a direct fuel-injection engine mounted car, a part of the fuel returns to the tank to raise the fuel temperature in the tank to a level of from 60 to 80° C. Further, the fuel tank of the present invention is welded by the above welding material, whereby it is possible to suppress fuel diffusion from the joint area with the tank body, and it is also possible to present a fuel tank excellent in a long-term performance.

DETAILED DESCRIPTION OF THE PREFERRED EMBODIMENTS

The present invention is directed to the welding material comprising a modified polyethylene resin composition (Z) which comprises the modified polyethylene resin (X) obtained by modifying a polyethylene resin (A) satisfying the specific density and MFR and the unmodified polyethylene resin (Y) satisfying the specific density, MFR and melt flow rate ratio, and further, as the case requires, other polyethylene resin (D), and the fuel tank thereby welded.

Now, the present invention will be described in detail with reference to the preferred embodiments.

1. Components Constituting Modified Polyethylene Composition (Z)

(1) Polyethylene Resin (A)

The polyethylene resin (A) as the raw material for the modified polyethylene resin (X) to be used in the present invention, is meant for a homopolymer of ethylene or a copolymer of ethylene with an α-olefin, having the following specific density and MFR, and it usually includes a polyethylene resin (A1) produced by ion polymerization, such as a high density polyethylene resin, a linear low density polyethylene resin or a linear ultralow density polyethylene resin, produced by ion polymerization, and an ethylene (co)polymer (A2) such as low density polyethylene produced by radical polymerization.

Density

The polyethylene resin (A) has a density of from 0.910 to 0.965 g/cm$^3$, preferably from 0.915 to 0.960 g/cm$^3$, more preferably from 0.920 to 0.958 g/cm$^3$. If the density of the polyethylene resin (A) is less than 0.910 g/cm$^3$, the bond strength of the modified polyethylene resin (X) will not be improved, and the gasoline permeation resistance tends to be low, and if it exceeds 0.965 g/cm$^3$, the rigidity or creep resistance tends to be low, and the long-term performance may not be satisfied.

Here, the density is a value measured in accordance with the test method prescribed in JIS K6922-1 (1997).

Melt Flow Rate (MFR)

The polyethylene resin (A) has a melt flow rate (MFR) of from 0.1 to 5.0 g/10 min, preferably from 0.2 to 3.0 g/10 min, more preferably from 0.3 to 2.0 g/10 min at a temperature of 190° C. under a load of 2.16 kg. If MFR of the polyethylene resin (A) is less than 0.1 g/10 min, the injection molding processability is likely to be low, and if it exceeds 5 g/10 min, the impact resistance or creep resistance is likely to be low.

Here, MFR is a value measured in accordance with the test method prescribed in JIS K6922-1 (1997) under condition D (temperature: 190° C., load: 2.16 kg).

The density of the polyethylene resin (A) can be controlled by the type and content of an α-olefin, and as the content increases, the density tends to be low. MFR may be controlled by a chain transfer agent such as hydrogen or by a process. Such controlling methods are well known to those skilled in the art. The polyethylene resin (A) in the present invention may be one having two or more polyethylene resins (A) mixed, so long as the above conditions are satisfied.

The polyethylene resin (A1) produced by ion polymerization and the ethylene (co)polymer (A2) produced by radical polymerization will now be described which may preferably be used.

(i) Polyethylene Resin (A1)

The polyethylene resin (A1) produced by ion polymerization which can be used in the present invention, includes a linear low density polyethylene resin constituted by an ethylene/α-olefin copolymer having a density of from 0.910 to less than 0.940 g/cm$^3$ and a MFR within a range of from 0.1 to 5.0 g/10 min, and a high density polyethylene resin constituted by an ethylene homopolymer or an ethylene/α-olefin copolymer, having a density of from 0.940 to 0.965 g/cm$^3$ and a MFR of from 0.1 to 5.0 g/10 min.

As such an α-olefin, a linear or branched $C_{3-20}$ olefin is preferred, and propylene, 1-butene, 1-pentene, 1-hexene, 4-methyl-1-pentene, 1-octene or 1-decene may, for example, be mentioned. Otherwise two or more of them may be used in combination. Among such copolymers, an ethylene/1-butene copolymer, an ethylene/1-hexene copolymer, an ethylene/4-methyl-1-pentene copolymer or an ethylene/1-octene copolymer is preferred from the viewpoint of the economical efficiency.

The polyethylene resin (A1) to be produced by ion polymerization, which can be used in the present invention, may be preferably produced by means of a specific Ziegler catalyst, Phillips catalyst or single site catalyst disclosed in e.g. JP-B-55-14084 or JP-B-58-1708 by controlling the polymerization conditions such as the polymerization temperature, pressure, etc., and a co-catalyst, etc.

Further, the polyethylene resin (A1) is further preferably a copolymer obtainable by copolymerizing ethylene with a $C_{3-20}$ α-olefin particularly in the presence of an olefin polymerization catalyst which comprises an organic aluminum oxy compound and a compound of a transition metal in Group IV of the Periodic Table containing a ligand having a cyclopentadienyl skeleton.

The polyethylene resin (A1) produced by ion polymerization is not particularly limited by the catalyst or process for its production, and it can be produced by the method disclosed in e.g. "Polyethylene Gijutsu Dokuhon" (edited by Kazuo Matsuura and Naotaka Mikami, published by Kogyo Chosakai in 2001), p. 123-160, p. 163-196. Namely, it can be produced by means of a Ziegler catalyst, Philips catalyst or singe sight catalyst by various polymerization systems such as a slurry method, a solution method and a gas phase method by various polymerization apparatus under various polymerization conditions.

(ii) Ethylene (Co)Polymer (A2) Produced by Radical Polymerization

The ethylene (co)polymer (A2) produced by radical polymerization, which can be used in the present invention, may, for example, be an ethylene homopolymer (a low density polyethylene resin), an ethylene/vinyl ester copolymer and a copolymer of ethylene with an α,β-unsaturated carboxylic acid or its derivative, produced by a high pressure radical polymerization method. Such low density polyethylene resin, etc. may be produced by a known high pressure radical polymerization method and may be produced by either a tubular method or an autoclave method.

The above low density polyethylene resin is preferably one having a density of from 0.910 to 0.935 g/cm$^3$ and a melt flow rate within a range of from 0.1 to 5.0 g/10 min.

The ethylene/vinyl ester copolymer is a copolymer of ethylene as the main component with a vinyl ester monomer such as vinyl propionate, vinyl acetate, vinyl caproate, vinyl caprylate, vinyl laurate, vinyl stearate, or vinyl trifluoroacetate. Among them, particularly preferred is vinyl acetate. Preferred is a copolymer comprising from 50 to 99.5 wt % of ethylene, from 0.5 to 50 wt % of the vinyl ester and from 0 to 49.5 wt % of other co-polymerizable unsaturated monomers.

Further, the vinyl ester content is selected within a range of from 3 to 20 wt %, particularly preferably from 5 to 15 wt %.

A typical example of the copolymer of ethylene with an $\alpha,\beta$-unsaturated carboxylate may, for example, be a binary or multicomponent copolymer, such as an ethylene/(meth) acrylic acid or its alkyl ester copolymer, such as an ethylene/methyl acrylate copolymer, an ethylene/ethyl acrylate copolymer, an ethylene/butyl acrylate copolymer, an ethylene/methyl methacrylate copolymer or an ethylene/ethyl methacrylate copolymer; or an ethylene/maleic anhydride/vinyl acetate copolymer, an ethylene/maleic anhydride/methyl acrylate copolymer or an ethylene/maleic anhydride/ethyl acrylate copolymer.

Namely, such a comonomer may, for example, be methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate or lauryl methacrylate. Among them, particularly preferred is an alkyl ester such as methyl(meth)acrylate or ethyl (meth)acrylate. The content of such a (meth)acrylate is within a range of from 3 to 30 wt %, preferably from 5 to 20 at %.

The polyethylene resin (A) to be used in the present invention may be one having the above polyethylene resins (A1) and (A2) suitably mixed, or a blend product with other polyethylene resins, so long as the above physical properties are satisfied.

(2) Modified Polyethylene Resin (X)

The modified polyethylene resin (X) to be used in the present invention is a modified polyethylene resin obtained by grafting at least one monomer selected from the group consisting of the following unsaturated carboxylic acid and its derivative to the polyethylene resin (A) having the above-described properties by means of e.g. a radical initiator as described below.

(i) Unsaturated Carboxylic Acid or its Derivative as Monomer

As at least one monomer selected from the group consisting of an unsaturated carboxylic acid and its derivative, to be used in the present invention, a monobasic unsaturated carboxylic acid, a dibasic unsaturated carboxylic acid, and their metal salts, amides, imides, esters and anhydrides, may be mentioned. The carbon number of the monobasic unsaturated carboxylic acid is at most 20, preferably at most 15. Whereas, the carbon number of the dibasic unsaturated carboxylic acid is at most 30, preferably at most 25, and the carbon number of its derivative is at most 30, preferably at most 25. Among such unsaturated carboxylic acids and their derivatives, acrylic acid, methacrylic acid, maleic acid and its anhydride, 5-norbornene-2,3-dicarboxylic acid and its anhydride, and glycidyl methacrylate are preferred. Particularly preferred is maleic anhydride or 5-norbornene acid anhydride, since the bonding performance of the polyethylene resin composition will thereby be excellent.

With respect to the blend amount, at least one monomer selected from the group consisting of unsaturated carboxylic acid or its derivative is preferably from 0.05 to 5.0 parts by weight, more preferably from 0.1 to 3 parts by weight, particularly preferably from 0.2 to 2 parts by weight, per 100 parts by weight of the resin component. If the blend amount of such at least one monomer selected from the group consisting of an unsaturated carboxylic acid and its derivative is less than 0.05 part by weight, adequate welding performance as essentially desired will not be obtained, and if it exceeds 5.0 parts by weight, an unreacted monomer will increase to impair the bonding performance, such being undesirable.

(ii) Radical Initiator

As the radical initiator to be used for the graft modification in the present invention, an organic peroxide may be mentioned such as dicumyl peroxide, benzoyl peroxide, di-t-butyl peroxide, 2,5-dimethyl-2,5-di(t-butyl peroxy)hexane, 2,5-dimethyl-2,5-di(t-butyl peroxy)hexyne-3, 2,5-dimethyl-2,5-di(t-butyl peroxy)hexane, lauroyl peroxide, t-butyl peroxy benzoate, 1,1,3,3-tetramethylbutyl hydroperoxide, diisopropylbenzene hydroperoxide, t-butylcumyl peroxide, $\alpha,\alpha'$-bis (t-butyl peroxy-m-isopropyl)benzene, di-t-butyl diperoxy-isophthalate, n-butyl-4,4-bis(t-butyl peroxy)valerate, t-butyl peroxy benzoate, t-butyl peroxyacetate, cyclohexanone peroxide, t-butyl peroxylaurate or acetyl peroxide. Among them, one having a decomposition temperature of from 160 to 200° C. to obtain a half-life of one minute, is preferred. If the decomposition temperature is too low, the decomposition reaction is likely to start in an extruder before the raw material polyethylene resin (A) will be sufficiently plasticized, whereby the reaction rate tends to be low. On the other hand, if the decomposition temperature is too high, the reaction in e.g. the extruder will not be completed, and the amount of an unreacted unsaturated carboxylic acid and its derivative tends to be large.

The amount of the radical initiator to be incorporated is preferably within a range of from 0.005 to 0.5 part by weight, more preferably from 0.01 to 0.3 part by weight, per 100 parts by weight of the resin component. If it is less than 0.005 part by weight, no adequate grafting reaction will be carried out, and an unreacted monomer will increase, such being undesirable. On the other hand, if it exceeds 0.5 part by weight, gelation or fish eye tends to occur frequently, such being undesirable.

(iii) Modifying Method

The method for producing the modified polyethylene resin is carried out by adding from 0.05 to 2.0 parts by weight of at least one modifying monomer selected from the group consisting of an unsaturated carboxylic acid and its derivative and from 0.005 to 0.5 part by weight of a radical initiator to 100 parts by weight of the polyethylene resin (A), followed by melt-kneading or modifying in a solvent by means of a single screw extruder and/or a twin screw extruder or by means of a single reactor or plural reactors.

Specifically, a melt-kneading method by means of an extruder, a Banbury mixer or a kneader, a solution method wherein the materials are dissolved in a suitable solvent, a slurry method wherein the materials are suspended in a suitable solvent, or a so-called gas phase grafting method, may, for example, be mentioned. The treating temperature may suitably be selected taking into consideration the deterioration of the polyethylene resin (A), the decomposition of the unsaturated carboxylic acid or its derivative, the decomposition temperature of the peroxide to be used, etc. In the case of the above-mentioned melt kneading method, it is usually from 190 to 350° C., particularly preferably from 200 to 300° C.

Further, at the time of producing the modified polyethylene resin (X) in the present invention, for the purpose of improving the performance, it is possible to employ a known method as disclosed in JP-A-62-10107, such as a method of treating with an epoxy compound or a polyfunctional compound containing amino groups or hydroxyl groups during or after the above-mentioned graft modification, or a method of removing an unreacted monomer (such as an unreacted carboxylic acid or its derivative) or various byproduct components by heating or washing.

The higher the grafting amount of at least one monomer selected from the group consisting of the unsaturated carboxylic acid and its derivative, the better. However, it is usually within a range of from 0.001 to 5.0 wt %.

In the reaction to the polyethylene resin (A) by means of the above radical initiator, the grafting reaction and fine cross-linking of polyethylene will occur simultaneously, but by adjusting the resin temperature during the melt kneading to be at least 250° C., the grafting reaction takes place preferentially, whereby a high addition ratio of the monomer can be attained. Whereas, if the resin temperature is lower than 250° C., the fine cross-linking of the polyethylene resin takes place preferentially, whereby gelation or resin burning will increase, and the product quality of the obtainable modified polyethylene resin (X) will be deteriorated. Further, if the resin temperature exceeds 310° C., deterioration of the polyethylene itself will be accelerated, whereby gelation or resin burning will sharply increase, and the product quality will thereby be deteriorated.

Further, as the reaction is carried out at such a high temperature, it is necessary to suppress inclusion or air into the interior of e.g. the extruder or reactor as far as possible, and in the melt kneading, the retention of the resin in the extruder or the like for a long time should be avoided. For this purpose, it is preferred to carry out feeding of nitrogen in the vicinity of the inlet for the raw material resin.

At the time of producing the modified polyethylene resin (X) of the present invention, it is undesirable to add a commonly employed additive such as an antioxidant in order to preferentially carry out the reaction for grafting to the polyethylene resin (A) by suppressing an unnecessary side reaction. For example, if an antioxidant for a polyolefin is added, the antioxidant and the radical initiator are likely to exhibit mutual antagonism, whereby an unreacted unsaturated carboxylic acid or its derivative is likely to increase. Further, if a metal salt is added, the metal salt and the unsaturated carboxylic acid or its derivative are likely to react each other, whereby the bonding performance of the obtainable modified polyethylene resin is likely to deteriorate.

In the production of the modified polyethylene resin (X) of the present invention, it is preferred to modify the polyolefin resin material over a number of times, whereby the modification rate of at least one modifying monomer selected from the group consisting of the unsaturated carboxylic acid and its derivative can be sufficiently increased, the economical efficiency can be improved, a high modification rate can be accomplished with a relatively small amount of the modifying monomer, and it is possible to produce a modified polyolefin resin of high quality which is excellent in the bonding performance and free from gelation or resin burning without residual unreacted modifying monomer.

The graft modification rate obtainable by a modification method by such melt kneading is usually within a range of from 0.2 to 2.5 wt %. The higher the upper limit of the graft modification rate of the modified polyethylene resin (X) at the final stage, the better. However, it is usually within a range of from 0.55 to 2.5 wt %. However, the modification rate is not particularly limited within this range, and the higher the modification rate, the better.

(3) Unmodified Polyethylene Resin (Y)

The unmodified polyethylene resin (Y) to be used in the present invention is a resin having the following specific density, MFR and melt flow rate ratio, and it is a polyethylene resin having a wide molecular weight distribution produced by means of a Ziegler catalyst, Philips catalyst or single site catalyst by various polymerization systems such as a slurry method, a solution method and a gas phase method by various polymerization apparatus under various polymerization conditions. It is preferably an unmodified polyethylene resin (Y) comprising a polyethylene resin (B) satisfying the after-mentioned specific density and MFR and a polyethylene resin (C) satisfying the specific density and MFR, or an unmodified polyethylene resin (Y) constituted by an ethylene copolymer or an ethylene/α-olefin copolymer satisfying the above-mentioned density, MFR and melt flow rate ratio.

(i) Properties of Unmodified Polyethylene Resin (Y) Density

The unmodified polyethylene resin (Y) of the present invention has a density of from 0.930 to 0.965 g/cm$^3$, preferably from 0.932 to 0.963 g/cm$^3$, more preferably from 0.945 to 0.960 g/cm$^3$. If the density is less than 0.930 g/cm$^3$, the fuel permeation-preventing performance tends to deteriorate, and if it exceeds 0.965 g/cm$^3$, the impact resistance tends to deteriorate.

Melt Flow Rate (MFR)

With respect to MFR of the unmodified polyethylene resin (Y) of the present invention, the melt flow rate (MFR) at 190° C. under a load of 2.16 kg is from 0.01 to 5.0 g/10 min, preferably from 0.05 to 4.0 g/10 min, more preferably from 0.1 to 3.0 g/10 min. If MFR is less than 0.01 g/10 min, the moldability during the injection molding tends to extremely deteriorate, and if it exceeds 5.0 g/10 min, the impact resistance or creep resistance is likely to deteriorate.

Melt Flow Rate Ratio

The unmodified polyethylene resin (Y) of the present invention has a melt flow rate ratio (high load melt flow rate at a temperature of 190° C. under a load of 21.6 kg/melt flow rate at a temperature of 190° C. under a load of 2.16 kg) of from 40 to 270, preferably from 50 to 250, more preferably from 60 to 220, particularly preferably from 70 to 150.

If the melt flow rate ratio is less than 40, the long-term performance is likely to deteriorate, and if it exceeds 270, the impact resistance is likely to deteriorate.

Here, the melt flow rate ratio is a ratio of the high load melt flow rate (HL-MFR) at a temperature of 190° C. under a load of 21.6 kg to the melt flow rate (MFR) at a temperature of 190° C. under a load of 2.16 kg, and it represents the broadness of the molecular weight distribution. Namely, the larger the numerical value, the wider the molecular weight distribution, whereby the mechanical strength such as the impact resistance tends to deteriorate, while the molding processability will be improved.

In a case where a Ziegler catalyst is employed, such a melt flow rate ratio is adjusted usually by a method of controlling MFR by using e.g. a chain transfer agent such as hydrogen or by a method of controlling it by means of multistage polymerization, or by a combination thereof. Whereas, in a case where a chromium-containing catalyst is employed, such adjustment is usually carried out by controlling the polymerization temperature and pressure, the catalyst-activation conditions, the carrier species, etc. ("Polyethylene Gijutsu Dokuhon" (edited by Kazuo Matsuura and Naotaka Mikami, published by Kogyo Chosakai in 2001), p. 123-159).

(ii) Unmodified Polyethylene Resin (Y)

In a preferred embodiment of the present invention, the unmodified polyethylene resin (Y) comprises a polyethylene resin (B) satisfying a specific density and MFR and a polyethylene resin (C) satisfying a specific density and MFR and is constituted by a multistage polymerization product or mixture.

(iii) Polyethylene Resin (B)

The polyethylene resin (B) to be used in the present invention is a polyethylene resin having a low density and a high molecular weight and is one having the following density and MFR. For example, a linear low density polyethylene which is a copolymer of ethylene with an α-olefin, may be mentioned. Here, the α-olefin is not particularly limited so long as it is an α-olefin copolymerizable with ethylene. However, it is preferably one having from 3 to 12 carbon atoms. A typical example may be propylene, 1-butene, 1-pentene, 1-hexene, 4-methyl-1-pentene or 1-octene. A plurality of such α-olefins may be used in combination.

Density

The polyethylene resin (B) to be used in the present invention has a density of from 0.910 to 0.940 g/cm$^3$, preferably from 0.915 to 0.935 g/cm$^3$, more preferably from 0.920 to 0.930 g/cm$^3$. If the density is less than 0.910 g/cm$^3$, the gasoline permeation resistance is likely to deteriorate, and if it exceeds 0.940 g/cm$^3$, the impact resistance or creep resistance is likely to deteriorate.

High Load Melt Flow Rate

The polyethylene resin (B) to be used in the present invention has a high load melt flow rate (HL-MFR, measured at a temperature of 190° C. under a load of 21.6 kg) of from 0.05 to 10 g/10 min, preferably from 0.1 to 7 g/10 min, more preferably from 0.1 to 5 g/10 min. If HL-MFR is less than 0.05 g/10 min, the injection molding processability is likely to deteriorate, and if it exceeds 10 g/10 min, the impact resistance or creep resistance is likely to deteriorate.

HL-MFR may be controlled by a conventional means such as a method of controlling MFR by using e.g. a chain transfer agent such as hydrogen, a method of controlling it by adjusting the polymerization temperature or pressure, or by a combination thereof. These controlling methods are well known to those skilled in the art.

(iv) Polyethylene Resin (C)

The polyethylene resin (C) to be used in the present invention is a polyethylene resin having a high density and low molecular weight and is one having the following density and MFR. For example, a high density polyethylene being an ethylene homopolymer or a copolymer of ethylene with an α-olefin may be mentioned.

Density

The polyethylene resin (C) to be used in the present invention has a density of from 0.940 to 0.970 g/cm$^3$, preferably from 0.943 to 0.965 g/cm$^3$, further preferably from 0.945 to 0.960 g/cm$^3$. If the density is less than 0.940 g/cm$^3$, the impact resistance or creep resistance is likely to deteriorate, and if the density exceeds 0.970 g/cm$^3$, the impact resistance tends to be deteriorate.

Melt Flow Rate

The polyethylene resin (C) to be used in the present invention has a melt flow rate (measured at a temperature of 190° C. under a load of 2.16 kg) of from 5 to 600 g/10 min, preferably from 7 to 500 g/10 min, more preferably from 10 to 300 g/10 min. If MFR is less than 5 g/10 min, the moldability at the time of injection molding tends to be extremely poor, and if it exceeds 600 g/10 min, the impact resistance or creep resistance is likely to deteriorate.

(v) Blend Ratio of Polyethylene Resin (B) to Polyethylene Resin (C)

In the unmodified polyethylene resin (Y), the blend ratio of the polyethylene resin (B) to the polyethylene resin (C) is such that polyethylene resin (B)/polyethylene resin (C)=25-60 wt %/75-40 wt %, preferably polyethylene resin (B)/polyethylene resin (C)=30-55 wt %/70-45 wt %, more preferably polyethylene resin (B)/polyethylene resin (C)=35-50 wt %/65-50 wt %. If the polyethylene resin (B) is less than 25 wt % or if the polyethylene resin (C) exceeds 75 wt %, the full notch creep rupture time is likely to deteriorate, and if the polyethylene resin (B) exceeds 60 wt % or the polyethylene resin (C) is less than 40 wt %, the fluidity is likely to deteriorate.

(vi) Production of Unmodified Polyethylene Resin (Y)

The unmodified polyethylene resin (Y) of the present invention is a resin having the above-specified density, MFR and melt flow rate ratio, and so long as it is one constituted by the polyethylene resin (B) having the specific density and HL-MFR and the polyethylene resin (C) having the specific density and MFR, its production method is not particularly limited. Namely, it may be a polyethylene resin produced by multistage polymerization or a mixture of ethylene homopolymers or copolymers of ethylene with an α-olefin. However, it is particularly preferred to produce it by a multistage polymerization method, since it is thereby possible to easily obtain a desired polymer having a wide molecular weight distribution.

The above multistage polymerization method is an industrial process for producing a polyethylene resin to broaden the molecular weight distribution of the polyethylene resin. To broaden the molecular weight distribution of a polyethylene resin, a method of selecting a proper catalyst for polymerization or a method of selecting a proper polymerization condition may, for example, be mentioned, but there is a limit in the broadness of the molecular weight distribution of the polyethylene resin obtainable by these methods. In order to satisfy the performance required for a polyethylene resin in a specific application, a method is practically employed wherein a low molecular weight component is prepared on one hand and a high molecular weight component is prepared on the other hand, and they are then blended. This is a method wherein two or more reactors are used to prepare polyethylene resins having different molecular weights in the respective reactors, and such reactors are connected in series to carry out the blending continuously. As a production example by such multistage polymerization, for example, JP-A-08-301933 discloses a polyethylene excellent in stress cracking resistance and fracture toughness, which is an ethylene polymer comprising a low molecular weight component and a high molecular weight component having a comonomer selectively introduced to the high molecular weight side. Further, a polyethylene resin, or a pipe and a pipe joint, having an attention drawn to tie molecules, are disclosed in JP-A-09-286820, JP-A-11-228635 and JP-A-2003-064187. Further, the probability of presence of tie molecules and the probability of formation of tie molecules are disclosed, and JP-A-2000-109521 discloses a polyethylene pipe wherein the amount of a component having a molecular weight of at least 100,000 and an elution temperature of at least 90° C. by cross fractionation, satisfies a certain relation. JP-A-2000-519496 discloses a multimodal polyethylene prepared by producing a low molecular weight component ethylene copolymer, followed by a high molecular weight ethylene copolymer. Recently, a polyethylene which is a bimodal polyethylene comprising a low molecular weight component and a high molecular weight component and using 1-hexene as a comonomer, is disclosed in JP-A-2003-504442 and JP-A-2003-531233, and in each of Examples in these Patent Documents, firstly, a low molecular weight ethylene homopolymer is produced and then a high molecular weight ethylene/1-hexene copolymer is produced (an inverted two-stage polymerization method), or a high molecular weight and then a low molecular weight may be produced (a normal two-stage polymerization method).

Further, for example, JP-A-11-199719 discloses a polyethylene pipe comprising a high molecular weight component and a low molecular weight component such that the inclination of an approximately linear line of temperature-molecular weight by cross fractionation is from −0.5 to 0, prepared by using a metallocene catalyst other than a Ziegler catalyst.

In the present invention, a method may be mentioned wherein a polyethylene polymer as a polyethylene resin component (B) and a polyethylene polymer as a polyethylene resin component (C) are produced by two stage or higher multistage polymerization. The catalyst may be any one of a Ziegler catalyst, a metallocene catalyst and a Philips catalyst. However, usually with a metallocene catalyst, the compositional distribution may be narrow, but the molecular weight distribution will be also narrow. Accordingly, a Ziegler catalyst is preferred. As examples of such catalysts, catalysts disclosed in JP-A-2003-105016 may be mentioned. By such a multistage polymerization method, a polymer having a desired wide molecular weight distribution can easily be prepared. According to one of the most preferred methods for producing a polyethylene resin by the above multistage polymerization, using a transition metal catalyst such as a Ziegler catalyst, in a polymerization apparatus wherein two or more reactors are connected in series, a polyethylene resin component (B) having a low density and a high molecular weight is produced in at least one reactor at a previous stage, and a polyethylene resin component (C) having a high density and a low molecular weight is produced in a reactor at a later stage, or inversely, a polyethylene resin component (C) having a high density and a low molecular weight is firstly produced, and then a polyethylene resin component (B) having a low density and a high molecular weight is produced, in such an order continuously by suspension polymerization. The former is referred to as normal multistage polymerization and the latter is referred to as inverted multistage polymerization. However, the inverted multistage polymerization has a drawback that it requires an installation to purge unreacted hydrogen after the production of the polyethylene resin component (C), and the mixing of the polyethylene resin component (B) and the polyethylene resin component (C) is poor in uniformity. Accordingly, the former normal multistage polymerization is preferred.

The polymerization conditions in the respective reactors are not particularly limited so long as the desired components can be produced. However, the polymerization is usually carried out at a polymerization temperature of from 50 to 110° C. for a retention time of from 20 minutes to 6 hours, and the pressure is from 0.2 to 9 MPa although it depends also on the type of the solvent to be used.

Further, in a polymerization apparatus wherein two or three pipe loop reactors are connected in series, a polyethylene resin component (B) is produced in one or two reactors at a previous stage and a polyethylene resin component (C) is produced in the last reactor, continuously by suspension polymerization. In this method, in the first and second reactors, copolymerization of ethylene with an α-olefin is carried out while the molecular weight is adjusted by the weight ratio or partial pressure ratio of the hydrogen concentration to the ethylene concentration, or the polymerization temperature, or by both of them, and while the density is adjusted by the weight ratio or partial pressure ratio of the α-olefin concentration to the ethylene concentration. Here, there are ethylene and hydrogen in a reaction mixture flowing in from the reactor for producing the first stage polymer component and an α-olefin similarly flowing in, but the production is carried out by adding ethylene and/or hydrogen as the case requires.

The polymerization reaction mixture obtained by the polymerization in the first reactor is transferred via a connecting pipe to the second reactor by pressure difference. For the polymerization, an optional method may be applied such as a slurry polymerization method wherein the polymerized polymer particles are dispersed in a solvent, a solution polymerization method wherein the polymer particles are dissolved in a solvent, or a gas phase polymerization method wherein the polymer particles are dispersed in a gas phase.

As the hydrocarbon solvent to be used for the slurry polymerization method or the solution polymerization method, inert hydrocarbons such as propane, n-butane, isobutane, n-pentane, isopentane, hexane, heptane, octane, decane, cyclohexane, benzene, toluene and xylene may be employed alone or in combination as a mixture. In the case of the slurry polymerization, propane, n-butane or isobutane is preferred as the solvent so that even when the polymerization temperature is raised, the formed polyethylene polymer is hardly soluble in the solvent and the slurry state is maintained.

In the polymerization using a solid Ziegler catalyst, hydrogen is usually used as a so-called chain transfer agent to adjust the molecular weight. The hydrogen pressure is not particularly limited, but is usually, as the hydrogen concentration in the liquid phase, from $1.0 \times 10^{-5}$ to $1.0 \times 10^{-1}$ wt %, preferably from $5.0 \times 10^{-4}$ to $5.0 \times 10^{-2}$ wt %.

In the production of the unmodified polyethylene resin (Y) of the present invention, as a method for mixing various polymers, a blending method whereby the kneading degree becomes high, is preferred, and a method by means of a co-rotating or counter-rotating twin screw extruder, a single screw extruder, a Banbury mixer, a mating or non-mating continuous kneader or a Brabender kneader Brabender may, for example, be mentioned.

In a case where the unmodified polyethylene resin (Y) is produced by blending, it is particularly preferred to employ, as component (B), a linear low density polyethylene resin (B') having a density of from 0.910 to less than 0.940 g/cm$^3$ and a high load melt flow rate of from 0.1 to 10 g/10 min at a temperature of 190° C. under a load of 21.6 kg and as component (C), a high density polyethylene resin (C') having a density of from 0.940 to 0.970 g/cm$^3$ and a melt flow rate (temperature: 190° C., load: 2.16 kg) of from 5 to 300 g/10 min.

The above linear low density polyethylene resin (B') is preferably a linear low density polyethylene resin produced by ion polymerization, which has a density of from 0.910 to less than 0.940 g/cm$^3$, preferably from 0.915 to 0.935 g/cm$^3$, more preferably from 0.918 to 0.930 g/cm$^3$. Further, it is one having a high load melt flow rate (HL-MFR) within a range of from 0.05 to 10 g/10 min, preferably from 0.1 to 7 g/10 min, more preferably from 0.1 to 5 g/10 min. If the above density is less than 0.910 g/cm$^3$, the gasoline permeation resistance is likely to deteriorate, and if it exceeds 0.940 g/cm$^3$, the impact resistance or creep resistance is likely to deteriorate. Further, if the high load melt flow rate (HL-MFR) is less than 0.05 g/10 min, the moldability in injection molding tends to be extremely poor, and if it exceeds 10 g/10 min, the impact resistance or creep resistance is likely to deteriorate.

The linear low density polyethylene resin is a copolymer of ethylene with an α-olefin. As the α-olefin, a linear or branched $C_{3-20}$ olefin is preferred, and for example, propylene, 1-butene, 1-pentene, 1-hexene, 1-methyl-1-pentene, 1-octene or 1-decene may be mentioned. Further, they may be used in combination as a mixture of two or more of them. Among such copolymers, an ethylene/1-butene copolymer, an ethylene/1-hexene copolymer, an ethylene/4-methyl-1-pentene copolymer or an ethylene/1-octene copolymer is preferred from the viewpoint of the economical efficiency.

The linear low density polyethylene resin (B') to be produced by ion polymerization is not particularly limited by the process or catalyst for its production and may be produced by the method disclosed in e.g. "Polyethylene Gijutsu Dokuhon" (edited by Kazuo Matsuura and Naotaka Mikami, published by Kogyo Chosakai in 2001), p. 123-160, p. 163-196.

Namely, it can be produced by means of various catalysts such as a Ziegler catalyst and a single site catalyst, in various polymerization systems such as a slurry method, a solution method and a gas phase method, by various polymerization apparatus, under various polymerization conditions.

The linear low density polyethylene resin (B') may be preferably produced by using a specific Ziegler catalyst or single site catalyst as disclosed in e.g. JP-B-55-14084 or JP-B-58-1708 and controlling the polymerization conditions such as the polymerization temperature, pressure, etc., and the cocatalyst, etc.

More preferably, the linear low density polyethylene resin (B') is a copolymer obtained by copolymerizing ethylene with a $C_{3-20}$ α-olefin in the presence of an olefin polymerization catalyst (commonly referred to as a single site catalyst) comprising an organic aluminum oxy compound and a compound of a transition metal in Group IV of the Periodic Table containing a ligand having a cyclopentadienyl skeleton.

The above high density polyethylene resin (C') is preferably one having a density within a range of from 0.940 to 0.970 g/cm$^3$, preferably from 0.945 to 0.965 g/cm$^3$, more preferably from 0.950 to 0.960 g/cm$^3$. Further, it is one containing an ethylene homopolymer or a high density polyethylene resin constituted by an ethylene/α-olefin copolymer, having a melt flow rate (MFR) within a range of from 5 to 600 g/10 min, preferably from 7 to 500 g/10 min, more preferably from 10 to 300 g/10 min.

If the density is less than 0.940 g/cm$^3$, the impact resistance or creep resistance is likely to deteriorate, and if the density exceeds 0.970 g/cm$^3$, the impact resistance tends to deteriorate.

Further, if the melt flow rate (MFR) is less than 5 g/10 min, the moldability in injection molding tends to be extremely poor, and if it exceeds 600 g/10 min, the impact resistance or creep resistance is likely to deteriorate.

The high density polyethylene resin is constituted by an ethylene homopolymer or an ethylene/α-olefin copolymer. The α-olefin is preferably a linear or branched $C_{3-20}$ olefin, and for example, propylene, 1-butene, 1-pentene, 1-hexene, 1-methyl-1-pentene, 1-octene or 1-decene may be mentioned. Further, they may be used in combination as a mixture of two or more of them. Among such copolymers, an ethylene/1-butene copolymer, an ethylene/1-hexene copolymer, an ethylene/4-methyl-1-pentene copolymer, or an ethylene/1-octene copolymer, is preferred from the viewpoint of the economical efficiency.

The above high density polyethylene resin (C') to be produced by ion polymerization is not particularly limited by the process or catalyst for its production and may be produced by the method disclosed in e.g. "Polyethylene Gijutsu Dokuhon" (edited by Kazuo Matsuura and Naotaka Mikami, published by Kogyo Chosakai in 2001), p. 123-160, p. 163-196. Namely, it can be produced by means of a catalyst such as a Ziegler catalyst or a single site catalyst, in various polymerization systems such as a slurry method, a solution method and a gas phase method, by various polymerization apparatus, under various polymerization conditions.

Further, the high density polyethylene resin (C') may preferably be produced by using a specific Ziegler catalyst or single site catalyst as disclosed in e.g. JP-B-55-14084 or JP-B-58-1708 and by controlling the polymerization conditions such as the polymerization temperature, pressure, etc. and the cocatalyst, etc.

More preferably, the high density polyethylene resin (C') is a copolymer obtained by copolymerizing ethylene with a $C_{3-20}$ α-olefin in the presence of an olefin polymerization catalyst comprising an organic aluminum oxy compound and a compound of a transition metal in Group IV of the Periodic Table containing a ligand having a cyclopentadienyl skeleton.

(vii) Unmodified Polyethylene Resin (Y)

Another preferred unmodified polyethylene resin (Y) in the present invention is an ethylene homopolymer or an ethylene/α-olefin copolymer, which may be one obtained by a catalyst such as a Ziegler catalyst, a Philips catalyst or a metallocene catalyst, but preferably one produced by a chromium-containing catalyst.

Such a chromium-containing catalyst is preferably a supported catalyst having a chromium compound as an essential component, and it is formed by having a chromium compound and a titanium compound and/or a fluoro compound supported on a carrier of a dried inorganic oxide porous material and then drying the obtained composite composition in an inert gas or dry air at a temperature of from 100 to 300° C., followed by firing in dry air or dry oxygen at a temperature of from 250 to 1,000° C. for about 6 hours for activation, and it will be used after being thereby activated.

The chromium compound may, for example, be chromium oxide ($CrO_3$), chromium acetyl acetonate, chromic nitrate, chromic acetate, chromic chloride, chromic sulfate or ammonium chromate.

As a specific chromium-containing catalyst, chromium oxide or bis(cyclopentadienyl)chromium, or a magnesium-titanium composite thereof may, for example, be mentioned. By using such a chromium-containing catalyst, as compared with a titanium catalyst or a metallocene catalyst, it is possible to obtain a polyethylene having a wide molecular weight distribution and good injection moldability.

The carrier of an inorganic oxide porous material to support the catalyst in the chromium-containing catalyst is preferably a carrier having an average particle size of from 10 to 50 μm, preferably from 20 to 50 μm. In detail, it is one having an average particle size within a range of preferably of from 20 to 50 μm, more preferably from 30 to 50 μm, and a carrier having a large particle size of at least 100 μm is less than 10%, preferably less than 5%, more preferably less than 4%; more preferably a carrier having a large particle size of at least 90 μm is less than 10%; particularly preferably a carrier having a large particle size of at least 80 μm is less than 10%.

If the average particle size of the carrier is less than 10 μm, the carrier tends to be too fine, whereby the handling tends to be difficult, and the polymerization stability is likely to be impaired. If the average particle size exceeds 50 μm, when a polyethylene molded product is formed, the environmental stress cracking resistance (ESCR) of creep resistance is likely to deteriorate.

The average particle size of the carrier is a value obtainable by measuring the particle size distribution by means of a laser diffraction/scattering particle size distribution meter and calculating an arithmetic average size. As the measuring apparatus, for example, LA-920 model, manufactured by Horiba, Ltd. is preferred as it is excellent in precision in measurement.

Further, the inorganic oxide porous material is preferably selected from ones having a specific surface area of from 50 to 1,000 m$^2$/g, a pore diameter of from 5 to 500 Å and a pore volume within a range of from 0.5 to 3.0 cc/g.

The inorganic oxide porous material may, for example, be talc, silica, titania, alumina, magnesia, silica-titania, silica alumina, silica magnesia, silica chromia, silica chromia titania, silica titania alumina, tria, zirconia, silane-modified silica, aluminum phosphate gel and other inorganic oxide porous materials similar thereto, and further, a mixture of these carriers may be mentioned.

Particularly preferred is a carrier formed of a cogel or tergel as a transition metal-containing carrier. Such a transition metal-containing carrier may, for example, be silica-titania (Si—Ti) cogel, Si—Zr cogel, Si—V cogel, AlPO$_4$—Ti cogel, Silica-titania-chromium (Si—Ti—Cr) tergel or Si—Al—Ti tergel. Among such chromium-containing catalysts, the silica-titania cogel catalyst or the silica-titania-chromium (Si—Ti—Cr) tergel catalyst is preferred, and specific examples of these catalysts are disclosed in JP-A-61-031405, JP-A-02-160612, JP-A-11-071422, JP-A-11-106422, JP-A-11-506152, JP-A-2000-506152, JP-A-2001-515928, JP-A-2003-508593 and JP-A-2005-528512.

By using a chromium-containing catalyst employing such a transition metal-containing carrier, it is possible to easily produce a polyethylene resin having a melt flow rate ratio (HL-MFR/MFR) within a range of from 40 to 270 by polymerization under prescribed polymerization conditions.

2. Modified Polyethylene Resin Composition (Z)

The modified polyethylene resin composition (Z) of the present invention comprises the above components (X) and (Y) and has the following specific density and MFR, and preferably, it further has a specific gasoline permeation rate and a full notch creep rupture time of at least 50 hours (creep resistance). Thus, it may be used as an excellent welding material.

The blend proportions of the modified polyethylene resin (X) and the unmodified polyethylene resin (Y) are from 0.5 to 95 wt % of the modified polyethylene resin (X) and from 5 to 99.5 wt % of the unmodified polyethylene resin (Y), preferably from 0.5 to 50 wt % of the modified polyethylene resin (X) and from 50 to 99.5 wt % of the unmodified polyethylene resin (Y), more preferably from 0.5 to 30 wt % of the modified polyethylene resin (X) and from 70 to 99.5 wt % of the unmodified polyethylene resin (Y). If the modified polyethylene resin (X) is less than 0.5 wt %, the bond strength to the barrier material is likely to be inadequate, and if it exceeds 99.5 wt %, it tends to be difficult to control the creep resistance, and the possibility of problems in practical use or in economical efficiency due to an increase of costs, tends to be high.

Density

The modified polyethylene resin composition (Z) of the present invention has a density of from 0.938 to 0.965 g/cm$^3$, preferably from 0.939 to 0.962 g/cm$^3$, as measured in accordance with JIS K6299-2. If the density is less than 0.938 g/cm$^3$, the fuel permeation resistance of the joint area tends to deteriorate. Further, such will be a cause for delamination, cracking or the like at the interface with the barrier layer due to the dimensional change by swelling with the fuel.

Melt Flow Rate

The modified polyethylene resin composition (Z) of the present invention has a melt flow rate of from 0.05 to 1.0 g/10 min, preferably from 0.1 to 0.9 g/10 min as measured at a temperature of 190° C. under a load of 2.16 kg in accordance with JIS-K6922-2. If MFR is less than 0.05 g/10 min, the injection moldability at the time of molding the welding material tends to deteriorate, and failure in welding to the fuel tank is likely to occur. On the other hand, if it exceeds 1.0 g/10 min, the impact resistance or creep resistance of the welding material tends to deteriorate, and failure in welding to the fuel tank is likely to occur.

Gasoline Permeation Rate

The welding material of the present invention has a gasoline permeation rate through a sheet having a thickness of 1 mm being at most 50 mg/cm$^2$·24 hr, preferably at most 40 mg/cm$^2$·24 hr, more preferably at most 30 mg/cm$^2$·24 hr, as measured at 65° C. If the gasoline permeation rate exceeds 50 mg/cm$^2$·24 hr, such belongs to a conventional technical level.

Here, the gasoline permeation rate is a value measured in accordance with JIS Z0208 "Moisture-Permeation Test Method (Cup Method) for Moisture-proof Packaging Material". Specifically, it is obtained as follows.

In a stainless steel cup having a diameter of 80 mm, a depth of 40 mm and a wall thickness of 1 mm, 50 ml of commercial gasoline (ENEOS regular gasoline, manufactured by Nippon Oil Corporation) is filled, and a 1 mm sheet of the welding material is sandwiched between the cup and the stainless steel cover having a circular hole with a diameter of 60 mm. At that time, a Teflon® packing having a thickness of 0.5 mm is interposed and fixed between the stainless steel cup and the welding material sheet. In this state, the weight W$_0$ (mg) is measured. Then, the assembly is left to stand for 24 hours in an oven of 65° C., whereupon the weight (W) (mg) is measured. The gasoline permeation rate (T$_G$) (mg/cm$^2$·24 hr) calculated from the weight reduction i.e. the evaporated gasoline, is defined by the following formula:

$$T_G=(W_0-W)/28.3$$

Such a gasoline permeation rate (T$_G$) (mg/cm$^2$·24 hr) can be improved by increasing the density of the resin constituting the welding material. However, if the density is too high, the full notch creep rupture time is likely to deteriorate, and in order to adjust them to have a good balance, the density is preferably selected within a range of from 0.938 to 0.965 g/cm$^3$, preferably from 0.939 to 0.960 g/cm$^3$, further preferably from 0.940 to 0.955 g/cm$^3$.

Full Notch Creep Rupture Time

The full notch creep rupture time under 5.5 MPa as measured at 80° C., of the welding material of the present invention, is preferably at least 50 hours, more preferably at least 60 hours, further preferably at least 65 hours. If the full notch creep rupture time under 5.5 MPa as measured at 80° C. is less than 50 hours, the welding material tends to undergo creep rupture by the stress due to an increase of the internal pressure of the fuel tank, and the fuel is likely to leak therefrom, such being very dangerous. Here, the full notch creep rupture time is a value measured in accordance with JIS K6774 "Polyethylene Pipe for Gas, Appendix 5, Full Notch Creep". Specifically, it is obtained as follows.

A sheet having a thickness of 10 mm is prepared by a pressing method at 230° C. From this sheet, a square pillar of 6 mm×6 mm×60 mm is cut out, and by means of a notching jig, a razor blade notch with a depth of 1 mm is imparted all around the center portion of the test piece. Then, this test piece is adjusted at 80° C. for one hour and then the tensile creep test is carried out under a load of 9 kg, whereby the time required until the test piece has completely ruptured, is defined to be the creep rupture time.

To the welding material of the present invention, in addition to the above components (X) and (Y), other polyethylene resin (D) may be incorporated for the purpose of improving MFR and the density, or the gasoline permeation rate and/or the creep rupture time, as the case requires.

As the polyethylene resin (D), a high density polyethylene resin, a linear low density polyethylene resin or a linear ultralow density polyethylene resin produced by e.g. a Ziegler catalyst, a Philips catalyst or a single site catalyst, or an ethylene (co)polymer such as a low density polyethylene produced by radical polymerization, used as a raw material resin for the above-mentioned modified polyethylene, may be used.

Particularly preferred is a polyethylene resin by a single site catalyst (a high density polyethylene resin, a linear low density polyethylene resin or a linear ultralow density polyethylene resin). As such a polyethylene resin by a single site catalyst, the density is from 0.900 to 0.965 g/cm$^3$, preferably from 0.911 to 0.940 g/cm$^3$, more preferably from 0.912 to 0.940 g/cm$^3$, and the melt flow rate (MFR) at a temperature of 190° C. under a load of 2.16 kg as measured in accordance with JIS K6922-2 is from 0.01 to 5.0 g/10 min, preferably from 0.05 to 4.0 g/10 min, more preferably from 0.1 to 3.0 g/10 min.

The amount of component (D) to be incorporated is preferably at most 150 parts by weight, more preferably at most 100 parts by weight, more preferably at most 70 parts by weight. Within such a range, the density, MFR, etc. can be easily adjusted to be within the ranges required by the present invention, without impairing various physical properties.

The welding material of the present invention is a welding material to be welded to a fuel tank and contains the above-described modified polyethylene resin composition (Z) as the essential component. However, it may be a mixture having an engineering plastic, metal or a material thereof, or an inorganic filler, incorporated to such a modified polyethylene resin composition, within a range not to impair the purpose of the present invention.

Such an engineering plastic may, for example, be a polyamide (PA) resin such as nylon 6, nylon 6,6, nylon 11 or nylon 12, a hydroxyl group-containing resin such as an ethylene/vinyl alcohol copolymer (EVOH) or polyvinyl alcohol (PVA), a polyester resin such as polyethylene terephthalate (PET) or polybutylene terephthalate (PBT), an acrylonitrile/butadiene/styrene copolymer resin (ABS), an acrylonitrile/styrene copolymer resin (AS), polycarbonate (PC), polyacetal (POM), polyphenylene ether (PPE), or polyphenylene sulfide (PPS).

Further, the above-mentioned metal may, for example, be a metal such as iron, aluminum, copper, tin, zinc, nickel or titanium, or various alloys containing such metals.

Further, the inorganic filler may, for example, be talc, silica, calcium carbonate or mica. Among them, fine powder talc or fine powder mica having a plate crystal structure and having an average particle size of from 0.5 to 10 μm is preferred.

The material to be used suitably for the barrier layer may, for example, be the above-mentioned polyamide (PA) resin such as nylon 6, nylon 6,6, nylon 11 or nylon 12, a hydroxyl group-containing resin such as an ethylene/vinyl alcohol copolymer (EVOH) or a polyvinyl alcohol (PVA), a polyester resin such as polyethylene terephthalate (PET) or polybutylene terephthalate (PBT), an acrylonitrile/butadiene/styrene copolymer resin (ABS), an acrylonitrile/styrene copolymer resin (AS), an engineering plastic such as polycarbonate (PC), polyacetal (POM), polyphenylene ether (PPE) or polyphenylene sulfide (PPS) or a metal foil such as aluminum.

Further, to the modified polyethylene resin composition (Z) of the present invention, various other thermoplastic resins or additives may optionally be incorporated within a range not to depart from the objects of the present invention. Such additives may, for example, be an antioxidant, a neutralizing agent, a lubricant, a blocking-preventive agent, an antistatic agent, a pigment, a weather resistant stabilizer, a nucleating agent, a flame retardant, a filler, etc. However, a metal salt such as calcium stearate or zinc stearate is likely to reduce the bond strength to the barrier material, and it is better to avoid incorporation of such an additive.

By satisfying the above properties, the welding material of the present invention maintains the bond strength even after being in contact with a fuel such as gasoline, and even when it is used for a long period of time in a high temperature atmosphere, it is not only capable of maintaining the good fuel permeation-preventing performance, but also excellent in the creep rupture resistance or stress cracking resistance. It is capable of suppressing fuel diffusion from the joint area with the tank body and further is capable of presenting a fuel tank excellent in the long-term performance.

The welding material of the present invention may be one which is, in the form of a film, sheet, plate or the like made of the welding material, brought in contact with the contact surface of a fuel tank and welded to the fuel tank by e.g. a vibration welding method, an electrical heating method or an ultrasonic heating method.

The welding material of the present invention presents a remarkable effect particularly to a plastic fuel tank having at least its surface formed of a high density polyethylene, such as a high density polyethylene fuel tank or a plastic fuel tank constituted by a multilayered laminate structure comprising a main layer of high density polyethylene, an adhesive layer and a barrier layer, as described hereinafter.

Another embodiment of the welding material of the present invention is such that at the time of welding a fuel tank and a fuel tank attachment together, the fuel tank attachment is welded via a film, sheet or the like made of the welding material to a contact surface of the fuel tank.

Further, another embodiment of the welding material of the present invention is such that the welding material is a welding material constituting an attachment to a fuel tank, and such a welding material constitutes the entirety or a part of the attachment.

Namely, the welding material constituting the attachment such as a joint is made solely of the modified polyethylene resin composition of the present invention, and the welding material constituting the fuel tank attachment such as a joint and the fuel tank are welded together at the contact portion.

Otherwise, at least the contact portion to the fuel tank, of the joint, is made of the modified polyethylene resin composition as the welding material.

Further, another preferred embodiment of the present invention may be a welding material constituting a fuel tank attachment having an at least double-layered laminate structure comprising a layer of the welding material and a layer of a barrier material.

For example, it may be a welding material constituting a fuel tank attachment having a laminate structure of e.g. welding material layer/barrier material layer, welding material layer/barrier material layer/welding material layer, welding material layer/barrier material layer/welding material layer/barrier material layer, barrier material layer/welding material layer, or a laminate structure having a different material inserted between these layers.

More specifically, welding material layer/PA layer, welding material layer/EVOH layer, welding material layer/POM layer, welding material layer/PA layer/welding material layer, welding material layer/EVOH layer/welding material layer, welding material layer/PA layer/welding material layer/PA layer or welding material layer/PA layer/welding material layer, may, for example, be mentioned (PA: polyamide resin, EVOH: saponified product of ethylene/vinyl acetate copolymer, POM: polyacetal resin).

Such a welding material having a laminate structure is disposed so that the welding material layer is in contact with the fuel tank and then welded.

The welding material having such a laminate structure can be produced by a molding method, for example, injection molding such as two-color injection molding, or profile extrusion.

Attachment

The fuel tank attachment in the present invention is a joint or the like to be welded to the fuel tank, and specifically, it may, for example, be an inlet, various types of valves, a fuel hose, a fuel filler pipe connected to a filler opening, a supply pipe connected to an engine, a canister-connected nozzle, a connector or a separator.

The material to be used suitably for such attachments may, for example, be a polyolefin resin such as a high density polyethylene, the welding material of the present invention or polypropylene, a polyamide (PA) resin such as nylon 6, nylon 6,6, nylon 11 or nylon 12, a hydroxyl group-containing resin such as an ethylene/vinyl alcohol copolymer (EVOH) or polyvinyl alcohol (PVA), a polyester resin such as polyethylene terephthalate (PET) or polybutylene terephthalate (PBT), an acrylonitrile/butadiene/styrene copolymer resin (ABS), an styrene/styrene copolymer resin (AS), an engineering plastic such as polycarbonate (PC), polyacetal (POM), polyphenylene ether (PPE) or polyphenylene sulfide (PPS), a fiber-reinforced plastic composite material, a metal such as aluminum, iron or copper, a mixture thereof, a laminate structure or a composite material.

Fuel Tank

The fuel tank of the present invention is a fuel tank having the welding material of the present invention welded thereto.

The fuel tank includes a conventional metal tank and a plastic tank intended for weight reduction. The welding material of the present invention has a good bond strength to both of them.

Particularly in the case of a plastic tank, a firm bond strength will be obtained by selecting the same type of resin for the welding material as the resin of the plastic tank body, whereby the gasoline permeation resistance, creep rupture resistance, stress cracking resistance, etc., will likely be improved, and it is possible to present a totally superior product.

Further, the fuel tank of the present invention is preferably a plastic fuel tank having its surface layer made of a high density polyethylene, more preferably a plastic fuel tank made of a multi-layered laminate structure comprising a main layer of a high density polyethylene, an adhesive layer and a barrier layer. Further, for the plastic fuel tank, a regrind material layer may also be used, if desired.

Further, a preferred specific layer structure for the plastic fuel tank of the present invention may, for example, be a laminate of at least three layers, such as a three layer structure of three types i.e. thermoplastic resin layer such as high density polyethylene/adhesive layer/barrier layer, a five layer structure of three types i.e. thermoplastic resin layer/adhesive layer/barrier layer/adhesive layer/thermoplastic resin layer, or a six layer structure of four types i.e. thermoplastic resin layer/regrind layer/adhesive layer/barrier layer/adhesive layer/thermoplastic resin layer, or a laminate of two layers of two types such as adhesive layer/barrier layer or two layers of three types such as adhesive layer/barrier layer/adhesive layer. Such a layered structure may be applied not only to the above-mentioned fuel tank by a blow molding method, but also to a laminated fuel tank made of a tank shell component produced by e.g. an injection molding method or a sheet molding method.

The material to be used suitably for the above barrier layer may, for example, be the above-mentioned polyamide (PA) resin such as nylon 6, nylon 6,6, nylon 11 or nylon 12, a hydroxyl group-containing resin such as an ethylene/vinyl alcohol copolymer (EVOH), or polyvinyl alcohol (PVA), a polyester resin such as polyethylene terephthalate (PET) or polybutylene terephthalate (PBT), an acrylonitrile/butadiene/styrene copolymer resin (ABS), an styrene/styrene copolymer resin (AS), an engineering plastic such as polycarbonate (PC), polyacetal (POM), polyphenylene ether (PPE) or polyphenylene sulfide (PPS), or a metal foil of e.g. aluminum.

Further, as the adhesive layer, it is possible to use a modified polyethylene resin which used to be modified with e.g. an unsaturated carboxylic acid such as maleic anhydride or a modified polyethylene resin composition of the present invention, may, for example, be used.

Such a fuel tank may be molded by e.g. blow molding or injection molding.

A specific example of the method of welding to such a fuel tank may, for example, be an injection welding method such as two-color injection molding, vibration welding, die slide injection (DSI) or die rotary injection (DRI), an ultrasonic welding method, a spin welding method, a hot plate welding method, a heat ray welding method, a laser welding method or a high frequency induction heat welding method.

The molding resin temperature at the time of welding by an injection welding method such as two-color injection molding, DSI or SRI, is from 250 to 320° C., preferably from 270 to 300° C. Further, the die temperature at that time is from 30 to 120° C., preferably from 50 to 100° C. Such molding is carried out by a prescribed method.

The fuel tank of the present invention is a fuel tank having the welding material welded to the contact surface of the fuel tank. Another fuel tank is a fuel tank wherein the fuel tank and its attachment are welded via the welding material of the present invention.

Specifically, the fuel tank and its attachment are welded via e.g. a film, sheet or welding rod made of the welding material at the contact surface by e.g. a vibration welding method, an electric heating method or a ultrasonic heating method.

Further, another fuel tank is a fuel tank wherein the attachment containing the welding material of the present invention as a constituting material is welded by such a welding method via the constituting material made of the welding material. Further, another fuel tank is a fuel tank wherein an attachment containing as a constituting material an at least double-layered laminate structure comprising a welding material layer made of the welding material of the present invention and a layer of a barrier material, is welded via the welding material layer made of the welding material.

EXAMPLES

Now, the present invention will be described in further detail with reference to Examples. However, it should be understood that the present invention is by no means thereby restricted.

The test methods and the resin materials used in the Examples are as follows.

1. Test Methods (1) Melt flow rate (MFR): Measured in accordance with condition D (temperature: 190° C., load: 2.16 kg) of JIS K6922-1 (1997).

(2) High load melt flow rate (HL-MFR): Measured in accordance with condition D (temperature: 190° C., load: 21.6 kg) of JIS K6922-1 (1997).

(3) Density: Measured in accordance with JIS K6922-1 (1997).

(4) Gasoline permeation rate: Measured in accordance with JIS Z0208. Here, to measure the gasoline permeation rate, a 1 mm sheet of the welding material was prepared as follows. Using a T die sheet forming machine manufactured by Create Plastic K.K. wherein a 50 mm single screw extruder and a T die having a width of 200 mm and a lip of 1.5 mm were combined, a sheet having a width of 180 mm and a thickness of 1 mm was prepared under such conditions that the resin temperature was 230° C., the chill roll temperature was 40° C., and the withdrawing speed was 0.7 m/min. From this welding material sheet, a circular test piece having a diameter of 80 mm was cut out, and the gasoline permeation rate at 65° C. was measured.

(5) Full notch creep rupture time: Measured in accordance with JIS K6774, Appendix 5. Specifically, a sheet of a modified polyethylene resin composition having a thickness of 10 mm was prepared by a 230° C. press method, and from this sheet, a square pillar of 6 mm×6 mm×60 mm was cut out, and further, using a notching jig manufactured by Create Plastic K.K., a razor blade notch was imparted all around the center portion of the test piece in a depth of 1 mm to obtain a test piece. Then, this test piece was set on a Lander method stress cracking tester manufactured by Orientec Co., Ltd. and adjusted at 80° C. for one hour, whereupon a tensile creep test was carried out under a load of 9 kg, and the time until the test piece was completely ruptured, was measured.

(6) Test method for bond strength: Using a multilayer blow product molding machine manufactured by Modern Machinery K.K., a three kinds-five layered cylindrical hollow container (60 mm in diameter×180 mm) was produced under such conditions that the molding temperature was 200° C., the blow pressure was 0.6 MPa, the mold temperature was 20° C., and the cooling time was 120 sec. The layered structure of this container was, from the outer layer side, high density polyethylene resin layer (Novatec HD HB111R, manufactured by Japan Polyethylene Corporation, density: 0.944 g/cm$^3$, MFR: 0.04 g/min, melt flow ratio ($MI_{21.6}/MI_{2.16}$): 149)/welding material layer/nylon (Amilane CM6246M, manufactured by Toray Industries, Inc.)/welding material layer/high density polyethylene resin layer (Novatec HD HB111R, manufactured by Japan Polyethylene Corporation), and the layer thicknesses were 1.8 mm/0.12 mm/0.2 mm/0.12 mm/1.8 mm.

Thereafter, from a flat portion at the bottom in the deep drawing direction of the container obtained by the blow molding, a strip specimen having a size of 6 mm in width×100 mm in length was cut out in a MD direction, and the bond strength between the second layer (welding material) and the third layer (nylon) from the outer layer side of the specimen was measured. The measurement of the bond strength was carried out by a method wherein a slit was imparted at a center between the second and third layers from the outer layer side of the test specimen, and 90° peeling was carried out at a tensile speed of 50 mm/min by means of a Tensilon UTM-III-500, manufactured by Toyo Baldwin K.K.

2. Resin Materials

Modified Polyethylene Resin (X)

Modified polyethylenes (X-1) to (X-3) obtained in the following Preparation Examples 1 to 3 were used. The production conditions and the physical properties of (X-1) to (X-3) are shown in Table 1.

Preparation Example 1

(i) Production of Polyethylene Resin (A1)

To a catalyst preparation apparatus equipped with an electromagnetic induction stirrer, 1,000 ml of purified toluene, 22 g of tetraethoxy zirconium (Zr(OEt)$_4$), 75 g of indene and 88 g of methylbutyl cyclopentadiene were added, and while the temperature was maintained at 90° C., 100 g of tripropyl aluminum was dropwise added over a period of 100 minutes. Then, at the same temperature, the mixture was reacted for two hours. After cooling the reaction mixture to 40° C., 3,200 ml of a toluene solution of methyl almoxane (concentration 2.5 mmol/ml) was added, followed by stirring for two hours. Then, 2,000 g of silica (#952, manufactured by Grace Company, surface area: 300 m$^2$/g) preliminarily treated by firing at 450° C. for 5 hours, was added, followed by stirring at room temperature for one hour. Then, nitrogen blowing at 40° C. and drying under reduced pressure were carried out to obtain a solid catalyst having good flowability.

Using a continuous system fluidized bed gas phase polymerization apparatus, copolymerization of ethylene with 1-hexene was carried out at a polymerization temperature of 65° C. under a total pressure of 2 MPa. The above solid catalyst was continuously supplied and polymerization was carried out by supplying ethylene, 1-hexene and hydrogen so that they maintained a prescribed molar ratio to obtain a powdery single site type polyethylene resin (A1) having a MFR of 3.2 g/10 min and a density of 0.932 g/cm$^3$.

(ii) Production of Modified Polyethylene Resin (X-1)

To 100 parts by weight of the above powdery polyethylene resin (A1), 0.6 part of maleic anhydride and 0.02 part of 2,5-dimethyl-di-(t-butyl peroxy)hexane were added, followed by mixing by a Henschel mixer. Then, the mixture was kneaded by means of a 50 mm single screw extruder, manufactured by Modern Machinery K.K. under such conditions that the screw rotational speed was 50 rpm, and the resin temperature was 280° C., to obtain a single site type modified polyethylene resin (X-1) having a MFR of 2.1 g/10 min, a density of 0.932 g/cm$^3$ and a graft rate of 0.42 wt %.

Preparation Example 2

(i) Production of Modified Polyethylene Resin (X-2)

In accordance with the disclosure in Example 1 in JP-B-55-14084, ethylene and butene-1 were copolymerized by slurry polymerization by means of a Ziegler catalyst and by adjusting the feeding amounts of a comonomer and hydrogen, to obtain a powdery high density polyethylene resin (A2) having a MFR of 0.8 g/10 min and a density of 0.950 g/cm$^3$.

To 100 parts by weight of the above powdery high density polyethylene resin (A2), 0.8 part of maleic anhydride and 0.02 part of 2,5-dimethyl-di-(t-butyl peroxy)hexane were added, followed by mixing by a Henschel mixer. Then, the mixture was melt-kneaded by means of a 50 mm single screw extruder, manufactured by Modern Machinery K.K. under such conditions that the screw rotational speed was 50 rpm and the resin temperature was 280° C., to obtain a modified polyethylene resin (X-2) having a MFR of 0.15 g/10 min, a density of 0.950 g/cm$^3$ and a graft rate of 0.55 wt %.

Preparation Example 3

(i) Production of Modified Polyethylene Resin (X-3)

In accordance with the disclosure in Example 5 in JP-A-10-29824, ethylene and butene-1 were copolymerized by slurry polymerization by means of a Ziegler catalyst to obtain a powdery linear low density polyethylene resin (A3) having a MFR of 2.2 g/10 min and a density of 0.935 g/cm$^3$.

To 100 parts by weight of the above powdery linear low density polyethylene resin (A3), 0.8 part of maleic anhydride and 0.02 part of 2,5-dimethyl-di-(t-butyl peroxy)hexane were added, followed by mixing by a Henschel mixer. Then, the mixture was melt-kneaded by means of a 50 mm single screw extruder, manufactured by Modern Machinery K.K. under such conditions that the screw rotational speed was 50 rpm and the resin temperature was 280° C., to obtain a modified polyethylene resin (X-3) having a MFR of 0.50 g/10 min, a density of 0.935 g/cm$^3$ and a graft rate of 0.55 wt %.

TABLE 1

| Resin | Item | Unit | Modified polyethylene resin (X-1) | Modified polyethylene resin (X-2) | Modified polyethylene resin (X-3) |
|---|---|---|---|---|---|
| polyethylene resin (A) | Type | — | A1 | A2 | A3 |
| | MFR | g/10 min | 3.2 | 0.8 | 2.2 |
| | Density | g/cm$^3$ | 0.932 | 0.950 | 0.935 |
| | Amount | Parts by weight | 100 | 100 | 100 |
| Maleic anhydride monomer | Amount | Parts by weight | 0.6 | 0.8 | 0.8 |
| Radical initiator | Amount | Parts by weight | 0.02 | 0.02 | 0.02 |
| Properties of modified polyethylene resin (X) | MRF | g/10 min | 2.1 | 0.15 | 0.50 |
| | Density | g/cm$^3$ | 0.932 | 0.950 | 0.935 |
| | Graft rate | wt % | 0.42 | 0.55 | 0.55 |

Unmodified Polyethylene Resin (Y1)

(Y1-1) to (Y1-7) obtained in the following Preparation Examples 4 to 11 were used.

Preparation Example 4

Using a Ziegler catalyst disclosed in Example 1 in JP-A-58-1708 and a two stage slurry polymerization process of a double loop type reactor system, a solid catalyst component from a catalyst supply line and triethyl aluminum (TEA) from an organic metal compound supply line were continuously supplied in prescribed amounts to a polymerization reactor having an internal capacity of 200 L as a first reactor, at 90° C., a polymerization solvent (n-hexane), ethylene and hydrogen were supplied at prescribed rates to continuously carry out the first stage copolymerization (production of the polyethylene resin component (C1)). Then, a part of the polymerization product in the first reactor was sampled, and the physical properties of the polymerization product were measured. The results are shown in Table 2. The slurried polymerization product formed in the first reactor was introduced as it was in the entire amount into a second reactor having an internal capacity of 400 L, and while the content of the polymerization reactor was discharged at a prescribed rate, at 70° C., a polymerization solvent (n-hexane), ethylene, 1-butene and hydrogen were supplied to continuously carry out the second stage polymerization (polymerization of polyethylene resin component (B1)), to finally obtain an unmodified polyethylene resin (Y1-1). From the physical properties of the unmodified polyethylene resin (Y1-1) and the physical properties of the component (C1) obtained in the first reactor, the physical property values of component (B1) were obtained by calculation based on additivity law. The physical property values of the respective components are shown in Table 2.

Preparation Example 5

(1) Production of Linear Low Density Polyethylene Resin (B1')

In accordance with the disclosure in Example 1 in JP-A-58-1708, ethylene and butene-1 were copolymerized by slurry polymerization by means of a Ziegler catalyst by adjusting the hydrogen and comonomer concentrations to obtain a linear low density polyethylene resin (B1') having a HL-MFR of 2.2 g/10 min and a density of 0.927 g/cm$^3$.

(2) Production of High Density Polyethylene Resin (C1')

(i) Production of Catalyst

As a solid catalyst component, a Ti type catalyst by a dissolution/precipitation method was used. The method for its production is as follows. The interior a three-necked flask having a capacity of 1 L and equipped with a stirrer and a condenser was sufficiently replaced with nitrogen, and then 250 ml of dry hexane, 11.4 g of anhydrous magnesium chloride preliminarily subjected to pulverization treatment for one hour by a 3 L vibration mill and 110 ml of n-butanol were introduced, followed by heating at 68° C. for two hours to obtain a uniform solution (1a). This solution (1a) was cooled to room temperature, and then, 8 g of methylpolysiloxane having a kinematic viscosity of 25 cSt (centistokes) at 25° C., was added, followed by stirring for one hour to obtain a uniform solution (1b). The solution (1b) was cooled with water, and then, 50 ml of titanium tetrachloride and 50 ml of dry hexane were dropwise added thereto over a period of one hour by means of a dropping funnel to obtain a solution (1c). The solution (1c) was uniform, and no complex of the reaction product precipitated. While the solution (1c) was refluxed, heat treatment was carried out at 68° C. for two hours. After about 30 minutes from the initiation of the heating, precipitation of the reaction product complex (1d) was observed. The precipitate was collected and washed six times with 250 ml of dry hexane and further dried by nitrogen gas to recover 19 g of the reaction product complex (1d). The reaction product complex (1d) was analyzed and was found to contain 14.5 wt % of Mg, 44.9 wt % of n-butanol and 0.3 wt % of Ti, and its specific surface area was 17 m$^2$/g. 4.5 g of the reaction product complex (1d) was taken into a three-necked flask having a capacity of 1 L equipped with a stirrer and a condenser in a nitrogen atmosphere, and 250 ml of dry hexane and 25 ml of titanium tetrachloride were added thereto, followed by heat treatment at 68° C. for two hours under reflux. It was cooled to room temperature and then washed six times with 250 ml of dry hexane and dried by nitrogen gas to recover 4.6 g of a solid catalyst component (1e). This solid catalyst component (1e) was analyzed and found to contain 12.5 wt % of Mg, 17.0 wt % of n-butanol and 9.0 wt % of Ti, and its specific surface area was 29 m$^2$/g. This solid catalyst component (1e) was observed by SEM (scan-

TABLE 2

| First reactor | | | Second reactor | | | Unmodified polyethylene resin (Y1-1) | | |
|---|---|---|---|---|---|---|---|---|
| Component (C1) | | | Component (B1) | | | | | HL-MFR/MFR |
| Density g/cm$^3$ | MFR g/10 min | Proportion wt % | Density g/cm$^3$ | HL-MFR g/10 min | Proportion wt % | Density g/cm$^3$ | MFR g/10 min | (—) |
| 0.963 | 100 | 50 | 0.927 | 2.2 | 50 | 0.945 | 0.31 | 103 | ning electron microscope), whereby the particle size was uniform, and the shape was close to a spherical shape.

(ii) Production of Polymer

The solid catalyst component (1e) obtained as described above, from a catalyst supply line and triethyl aluminum (TEA) from an organic metal compound supply line were continuously supplied at prescribed rates to a polymerization reactor having an internal capacity of 200 L as a reactor, and while the content of the polymerization reactor was discharged at a prescribed rate, at 80° C., a polymerization solvent (n-hexane) and prescribed amounts of ethylene, 1-butene and hydrogen were supplied to carry out polymerization continuously under a condition of a total pressure of 1.1 MPa to obtain a polymer (C1').

The physical properties of the polymer (C1') are as follows.
Density: 0.963 g/cm$^3$, and MFR: 100 g/10 min.

(3) Production of Unmodified Polyethylene Resin (Y1-2)

50 wt % of the above linear low density polyethylene resin (B1') and 50 wt % of the high density polyethylene resin (C1') were blended to obtain an unmodified polyethylene resin (Y1-2) having a melt flow rate ratio of 103. The results are shown in Table 3.

TABLE 3

| Component B | | | Component C | | | Unmodified polyethylene resin (Y1-2) | | |
|---|---|---|---|---|---|---|---|---|
| Component (B1') | | | Component (C1') | | | | | HL-MFR/MFR |
| Density g/cm$^3$ | HL-MFR g/10 min | Proportion wt % | Density g/cm$^3$ | MFR g/10 min | Proportion wt % | Density g/cm$^3$ | MFR g/10 min | (—) |
| 0.927 | 2.2 | 50 | 0.963 | 100 | 50 | 0.945 | 0.28 | 103 |

Preparation Example 6

(1) In accordance with the disclosure in Example 1 in JP-B-2-35766, ethylene and butene-1 were copolymerized by slurry polymerization by means of a Ziegler catalyst by adjusting the feeding amounts of a comonomer and hydrogen, to produce a linear low density polyethylene resin (B2') having a HL-MFR of 0.23 g/10 min and a density of 0.927 g/cm$^3$.

(2) On the other hand, with respect to the high density polyethylene resin (C2'), in accordance with the production of the high density polyethylene resin (C1') in the above Preparation Example 5, ethylene and butene-1 were copolymerized by slurry polymerization by adjusting the feeding amounts of a comonomer and hydrogen to obtain a high density polyethylene resin (C2') having a MFR of 280 g/10 min and a density of 0.964 g/cm$^3$.

(3) Production of Unmodified Polyethylene Resin (Y1-3)

48 wt % of the above linear low density polyethylene resin (B2') and 52 wt % of the high density polyethylene resin (C2') were blended to obtain an unmodified polyethylene resin (Y1-3) having a melt flow rate ratio of 250. The results are shown in Table 4.

TABLE 4

| Component B | | | Component C | | | Unmodified polyethylene resin (Y1-3) | | |
|---|---|---|---|---|---|---|---|---|
| Component (B2') | | | Component (C2') | | | | | HL-MFR/MFR |
| Density g/cm$^3$ | HL-MFR g/10 min | Proportion wt % | Density g/cm$^3$ | MFR g/10 min | Proportion wt % | Density g/cm$^3$ | MFR g/10 min | (—) |
| 0.927 | 0.23 | 48 | 0.964 | 280 | 52 | 0.947 | 0.05 | 250 |

Preparation Example 7

Production of Unmodified Polyethylene Resin (Y1-4)

In accordance with the disclosure in Example 1 in JP-A-54-7488, ethylene and butene-1 were copolymerized by two stage slurry polymerization by means of a Ziegler catalyst by adjusting the feeding amounts of a comonomer and hydrogen, to produce 30 wt % of a low density polyethylene resin component (B2) having a HL-MFR of 0.15 g/10 min and a density of 0.915 g/cm$^3$ in the first reactor and 70 wt % of a high density second resin component (C2) having a MFR of 100 g/10 min and a density of 0.943 g/cm$^3$ in the second reactor, thereby to obtain an unmodified polyethylene resin (Y1-4). This unmodified polyethylene resin (Y1-4) had a melt flow rate ratio of 100. From the physical properties of the unmodified polyethylene resin (Y1-4) and the physical properties of the component (B2) obtained in the first reactor, the physical property values of component (C2) were obtained by calculation based on additivity law. The physical property values of the respective components are shown in Table 5.

TABLE 5

| First reactor | | | Second reactor | | | Unmodified polyethylene resin (Y1-4) | | |
|---|---|---|---|---|---|---|---|---|
| Component (B2) | | | Component (C2) | | | | | HL- |
| Density g/cm$^3$ | HL-MFR g/10 min | Proportion wt % | Density g/cm$^3$ | MFR g/10 min | Proportion wt % | Density g/cm$^3$ | MFR g/10 min | MFR/MFR (—) |
| 0.915 | 0.15 | 30 | 0.943 | 100 | 70 | 0.934 | 0.23 | 100 |

Preparation Example 8

(1) In accordance with the disclosure in Example 1 in JP-B-2-35766, ethylene and butene-1 were copolymerized by slurry polymerization by means of a Ziegler catalyst to obtain a linear low density polyethylene resin (B3') having a HL-MFR of 2.2 g/10 min and a density of 0.935 g/cm$^3$.

(2) On the other hand, with respect to the high density polyethylene resin (C3'), in accordance with the production of the high density polyethylene resin (C1') in the above Preparation Example 5, ethylene and butene-1 were copolymerized by slurry polymerization to obtain a high density polyethylene resin (C3') having a MFR of 100 g/10 min and a density of 0.967 g/cm$^3$.

(3) Production of Unmodified Polyethylene Resin (Y1-5)

50 wt % of the above linear low density polyethylene resin (B3') and 50 wt % of the high density polyethylene resin (C3') were blended to obtain an unmodified polyethylene resin (Y1-5). The unmodified polyethylene resin (Y1-5) had a melt flow rate ratio of 105. The results are shown in Table 6.

TABLE 6

| Component B | | | Component C | | | Unmodified polyethylene resin (Y1-5) | | |
|---|---|---|---|---|---|---|---|---|
| Component (B3') | | | Component (C3') | | | | | HL- |
| Density g/cm$^3$ | HL-MFR g/10 min | Proportion wt % | Density g/cm$^3$ | MFR g/10 min | Proportion wt % | Density g/cm$^3$ | MFR g/10 min | MFR/MFR (—) |
| 0.935 | 2.2 | 50 | 0.967 | 100 | 50 | 0.951 | 0.30 | 105 |

Preparation Example 9

(1) In accordance with the disclosure in Example 1 in JP-A-58-1708, ethylene and butene-1 were copolymerized by slurry polymerization by means of a Ziegler catalyst to obtain a powdery linear low density polyethylene resin (B4') having a HL-MFR of 30 g/10 min and a density of 0.930 g/cm$^3$.

(2) On the other hand, in accordance with the disclosure in Example 1 in JP-A-58-1708, ethylene was homo-polymerized by slurry polymerization by means of a Ziegler catalyst to obtain a powdery high density polyethylene resin (C4') having a MFR of 5.0 g/10 min and a density of 0.961 g/cm$^3$.

(3) Production of Unmodified Polyethylene Resin (Y1-6)

50 wt % of the above powdery linear low density polyethylene resin (B4') and 50 wt % of the powdery high density polyethylene resin (C4') were blended to obtain an unmodified polyethylene resin (Y1-6). This unmodified polyethylene resin (Y1-6) had a melt flow rate ratio of 47. The results are shown in Table 7.

TABLE 7

| Component B | | | Component C | | | Unmodified polyethylene resin (Y1-6) | | |
|---|---|---|---|---|---|---|---|---|
| Component (B4') | | | Component (C4') | | | | | |
| Density g/cm$^3$ | HL-MFR g/10 min | Proportion wt % | Density g/cm$^3$ | MFR g/10 min | Proportion wt % | Density g/cm$^3$ | MFR g/10 min | HL-MFR/MFR (—) |
| 0.930 | 30 | 50 | 0.961 | 5 | 50 | 0.945 | 2.4 | 47 |

Preparation Example 10

(1) In accordance with the disclosure in Example 1 in JP-A-58-1708, ethylene and butene-1 were copolymerized by slurry polymerization by means of a Ziegler catalyst to obtain a powdery linear low density polyethylene resin (B5') having a HL-MFR of 0.27 g/10 min and a density of 0.929 g/cm$^3$.

(2) On the other hand, in accordance with the disclosure in Example 1 in JP-A-58-1708, ethylene and butene-1 were copolymerized by slurry polymerization by means of a Ziegler catalyst to obtain a powdery high density polyethylene resin (C5') having a MFR of 320 g/10 min and a density of 0.963 g/cm$^3$.

(3) Production of Unmodified Polyethylene Resin (Y1-7)

46 wt % of the above powdery linear low density polyethylene resin (B5') and 54 wt % of the powdery high density polyethylene resin (C5') were blended to obtain an unmodified polyethylene resin (Y1-7). This unmodified polyethylene resin (Y1-7) had a melt flow rate ratio of 290. The results are shown in Table 8.

TABLE 8

| Component B | | | Component C | | | Unmodified polyethylene resin (Y1-7) | | |
|---|---|---|---|---|---|---|---|---|
| Component (B5') | | | Component (C5') | | | | | |
| Density g/cm$^3$ | HL-MFR g/10 min | Proportion wt % | Density g/cm$^3$ | MFR g/10 min | Proportion wt % | Density g/cm$^3$ | MFR g/10 min | HL-MFR/MFR (—) |
| 0.929 | 0.27 | 46 | 0.963 | 320 | 54 | 0.947 | 0.05 | 290 |

Example 1

50 wt % of the modified polyethylene resin (X-1) and 50 wt % of the powdery unmodified polyethylene resin (Y1-1) were mixed, and to 100 parts by weight of this mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). Using the modified polyethylene resin composition (Z) as a welding material, the gasoline permeation rate, the full notch creep rupture time and the bond strength were measured or evaluated. The results are shown in Table 9.

Example 2

50 wt % of the modified polyethylene resin (X-1) and 50 wt % of the unmodified polyethylene resin (Y1-2) constituted by 50 wt % of the powdery linear low density polyethylene resin (B1) and 50 wt % of the powdery high density polyethylene resin (C1) (provided that the melt flow rate ratio was one measured separately by blending 50 wt % of the powdery linear low density polyethylene resin (B1) and 50 wt % of the high density polyethylene resin (C1), followed by pelletizing) were mixed, and further, to 100 parts by weight of this mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). Using the modified polyethylene resin composition (Z) as a welding material, the gasoline permeation rate, the full notch creep rupture time and the bond strength were measured or evaluated. The results are shown in Table 9.

Example 3

50 wt % of the modified polyethylene resin (X-1) and 50 wt % of the unmodified polyethylene resin (Y1-3) comprising 48 wt % of the powdery linear low density polyethylene resin (B2') and 52 wt % of the powdery high density polyethylene resin (C2'), were mixed, and further, to 100 parts by weight of this mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). Then, using this modified polyethylene resin composition (Z) as a welding material, the gasoline permeation rate, the full notch creep rupture time and the bond strength were measured or evaluated. The results are shown in Table 9.

Example 4

50 wt % of the modified polyethylene resin (X-2) and 50 wt % of the unmodified polyethylene resin (Y1-4) were mixed, and further, to 100 parts by weight of this mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). Using this modified polyethylene resin composition (Z) as a welding material, the gasoline permeation rate, the full notch creep rupture time and the bond strength were measured or evaluated. The results are shown in Table 9.

Example 5

57 wt % of the modified polyethylene resin (X-1), disclosed in Example 1 and 43 wt % of the unmodified polyethylene resin (Y1-5) were mixed, and further, to 100 parts by weight of this mixture, 43 parts by weight of commercially available high density polyethylene resin (D1) (Novatec HE122R, manufactured by Japan Polyethylene Corporation), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 9.

Example 6

57 wt % of the modified polyethylene resin (X-3) and 43 wt % of the unmodified polyethylene resin (Y1-5) were mixed, and further, to 100 parts by weight of this mixture, 43 parts by weight of commercially available high density polyethylene resin (D1) (Novatec HE122R, manufactured by Japan Polyethylene Corporation), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). Using the modified polyethylene resin composition (Z) as a welding material, the gasoline permeation rate, the full notch creep rupture time and the bond strength were measured or evaluated. The results are shown in Table 9.

TABLE 9

| Resin constitution | Item | Unit | Examples 1 | 2 | 3 | 4 | 5 | 6 |
|---|---|---|---|---|---|---|---|---|
| Polyethylene A | Type | — | A1 | A1 | A1 | A2 | A1 | A3 |
| | Density | g/cm$^3$ | 0.932 | 0.932 | 0.932 | 0.950 | 0.932 | 0.935 |
| | MFR | g/10 min | 3.2 | 3.2 | 3.2 | 0.8 | 3.2 | 2.2 |
| | Amount | Parts by weight | 100 | 100 | 100 | 100 | 100 | 100 |
| Maleic anhydride | Amount | Parts by weight | 0.6 | 0.6 | 0.6 | 0.8 | 0.6 | 0.8 |
| Radical initiator | Amount | Parts by weight | 0.02 | 0.02 | 0.02 | 0.02 | 0.02 | 0.02 |
| Modified polyethylene (X) | Type | — | X-1 | X-1 | X-1 | X-2 | X-1 | X-3 |
| | Density | g/cm$^3$ | 0.932 | 0.932 | 0.932 | 0.950 | 0.932 | 0.935 |
| | MFR | g/10 min | 2.1 | 2.1 | 2.1 | 0.15 | 2.1 | 0.50 |
| | Graft rate | wt % | 0.42 | 0.42 | 0.42 | 0.55 | 0.42 | 0.55 |
| | Proportion | wt % | 50 | 50 | 50 | 50 | 57 | 57 |
| Polyethylene B | Type | — | B1 | B1' | B2' | B2 | B3' | B3' |
| | Density | g/cm$^3$ | 0.927 | 0.927 | 0.927 | 0.915 | 0.927 | 0.927 |
| | HL-MFR | g/10 min | 2.2 | 2.2 | 0.23 | 0.15 | 0.23 | 0.23 |
| | Proportion | wt % | 50 | 50 | 48 | 30 | 50 | 50 |
| Polyethylene C | Type | — | C1 | C1' | C2' | C2 | C3' | C3' |
| | Density | g/cm$^3$ | 0.963 | 0.963 | 0.967 | 0.943 | 0.967 | 0.967 |
| | MFR | g/10 min | 100 | 100 | 280 | 100 | 100 | 100 |
| | Proportion | wt % | 50 | 50 | 52 | 70 | 50 | 50 |
| Unmodified polyethylene (Y) | Type | — | Y1-1 | Y1-2 | Y1-3 | Y1-4 | Y1-5 | Y1-5 |
| | Density | g/cm$^3$ | 0.945 | 0.945 | 0.947 | 0.934 | 0.951 | 0.951 |
| | MFR | g/10 min | 0.31 | 0.28 | 0.05 | 0.23 | 0.30 | 0.30 |
| | MFRR | — | 103 | 103 | 250 | 100 | 105 | 105 |
| | Proportion | wt % | 50 | 50 | 50 | 50 | 43 | 43 |
| (X) + (Y) | Proportion | Parts by weight | 100 | 100 | 100 | 100 | 100 | 100 |
| Polyethylene D | Type | — | | | | | D1 | D1 |
| | Density | g/cm$^3$ | | | | | 0.939 | 0.939 |
| | MFR | g/10 min | | | | | 0.20 | 0.20 |
| | Proportion | wt % | | | | | 43 | 43 |
| Modified polyethylene resin composition (Z) | Density | g/cm$^3$ | 0.939 | 0.939 | 0.941 | 0.942 | 0.940 | 0.939 |
| | MFR | g/10 min | 0.91 | 0.85 | 0.22 | 0.18 | 0.82 | 0.58 |
| Gasoline permeation rate | | mg/cm$^2$ · 24 hr | 48 | 48 | 46 | 43 | 47 | 49 |
| Full notch creep rupture time (FNCT) | | hr | 51 | 58 | 92 | 110 | 180 | 66 |
| Bond strength | | N/6 mm | 83 | 81 | 83 | 88 | 80 | 79 |

Preparation Example 11

(1) In accordance with the disclosure in Example 1 in JP-B-2-35766, ethylene and butene-1 were copolymerized by slurry polymerization by means of a Ziegler catalyst by adjusting the feeding amounts of a comonomer and hydrogen, to obtain a powdery linear low density polyethylene resin (B6') having a HL-MFR of 0.22 g/10 min and a density of 0.927 g/cm$^3$.

(2) On the other hand, with respect to the high density polyethylene resin (C6'), in accordance with the production of the high density polyethylene resin (C1') in the above Preparation Example 5, ethylene and butene-1 were copolymerized by slurry polymerization by adjusting the feeding amounts of a comonomer and hydrogen, to obtain a high density polyethylene resin (C6') having a MFR of 180 g/10 min and a density of 0.968 g/cm$^3$.

(3) Production of Unmodified Polyethylene Resin (Y1-8)

47 wt % of the above powdery linear low density polyethylene resin (B6') and 53 wt % of the high density polyethylene resin (C6') were blended to obtain an unmodified polyethylene resin (Y1-8) having a melt flow rate ratio of 250. The results are shown in Table 10.

TABLE 10

| Component B Component (B6') | | | Component C Component (C6') | | | Unmodified polyethylene resin (Y1-8) | | HL-MFR/ MFR (—) |
|---|---|---|---|---|---|---|---|---|
| Density g/cm$^3$ | HL-MFR g/10 min | Proportion wt % | Density g/cm$^3$ | MFR g/10 min | Proportion wt % | Density g/cm$^3$ | MFR g/10 min | |
| 0.927 | 0.22 | 47 | 0.968 | 180 | 53 | 0.950 | 0.08 | 125 |

Preparation Example 12

Production of Single Site Type Polyethylene Resin (D2)

To a catalyst preparation apparatus equipped with an electromagnetic induction stirrer, 1,000 ml of purified toluene, 22 g of tetraethoxy zirconium ($Zr(OEt)_4$), 75 g of indene and 88 g of methyl butyl cyclopentadiene were added in a nitrogen atmosphere, and while the temperature was maintained at 90° C., 100 g of tripropyl aluminum was dropwise added over a period of 100 minutes. Then, the mixture was reacted at the same temperature for two hours. The reaction mixture was cooled to 40° C., and then 3,200 ml of a toluene solution of methyl almoxane (concentration: 2.5 mmol/ml) was added, followed by stirring for two hours. Then, 2,000 g of silica (#952, manufactured by Grace Company, surface area: 300 $m^2/g$) preliminarily treated by firing at 450° C. for 5 hours, was added, followed by stirring for one hour. Then, at 40° C., nitrogen blowing and drying under reduced pressure were carried out to obtain a solid catalyst having good flowability.

Using a continuous fluidized bed gas phase polymerization apparatus, copolymerization of ethylene with 1-hexene was carried out at a polymerization temperature of 65° C. under a total pressure of 2 MPa. The above-mentioned solid catalyst was continuously supplied, and polymerization was carried out by supplying ethylene, 1-hexene and hydrogen so that they maintained a prescribed molar ratio, to obtain a powdery single site type polyethylene resin (D2) having a MFR of 2.2 g/10 min and a density of 0.918 $g/cm^3$.

Preparation Example 13

Production of Single Site Type Polyethylene Resin (D3)

To a catalyst preparation apparatus equipped with an electromagnetic induction stirrer, 1,000 ml of purified toluene, 22 g of tetraethoxy zirconium ($Zr(OEt)_4$), 75 g of indene and 88 g of methyl butyl cyclopentadiene were added in a nitrogen atmosphere, and while the temperature was maintained at 90° C., 100 g of tripropyl aluminum was dropwise added over a period of 100 minutes, and then, the mixture was reacted at the same temperature for two hours. The reaction mixture was cooled to 40° C., and then, 3,200 ml of a toluene solution of methyl almoxane (concentration: 2.5 mmol/ml) was added, followed by stirring for two hours. Then, 2,000 g of silica (#952, manufactured by Grace Company, surface area: 300 $m^2/g$) preliminarily treated by firing at 450° C. for 5 hours, was added, followed by stirring for one hour at room temperature. Then, at 40° C., nitrogen blowing and drying under reduced pressure were carried out to obtain a solid catalyst having good flowability.

Using a continuous fluidized bed gas phase polymerization apparatus, copolymerization of ethylene with 1-hexene was carried out at a polymerization temperature of 65° C. under a total pressure of 2 MPa. The above solid catalyst was continuously supplied, and polymerization was carried out by supplying ethylene, 1-hexene and hydrogen so that they maintained a prescribed molar ratio, to obtain a powdery single site type polyethylene resin (D3) having a MFR of 2.3 g/10 min and a density of 0.912 $g/cm^3$.

Example 7

53 wt % of the modified polyethylene resin (X-2) and 47 wt % of the unmodified polyethylene resin (Y1-8) were mixed, and further, to 100 parts by weight of such a mixture, 33 parts by weight of the single site type polyethylene (D2), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm, and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 11.

Example 8

71 wt % of the modified polyethylene resin (X-2) and 29 wt % of the unmodified polyethylene resin (Y1-8) were mixed, and further, to 100 parts by weight of the mixture, 43 parts by weight of the single site type polyethylene (D2), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm, and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 11.

Example 9

53 wt % of the modified polyethylene resin (X-2) and 47 wt % of the unmodified polyethylene resin (Y1-8) were mixed, and further, to 100 parts by weight of the mixture, 33 parts by weight of the single site type polyethylene (D3), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm, and the resin temperature was 230° C., to obtain a modified polyethylene resin composition (Z). Using this modified polyethylene resin composition (Z) as a welding material, the gasoline permeation rate, the full notch creep rupture time and the bond strength were measured or evaluated. The results are shown in Table 11.

TABLE 11

| Resin constitution | Item | Unit | Examples | | |
|---|---|---|---|---|---|
| | | | 7 | 8 | 9 |
| Polyethylene A | Type | — | A2 | A2 | A2 |
| | Density | $g/cm^3$ | 0.950 | 0.950 | 0.950 |
| | MFR | g/10 min | 0.8 | 0.8 | 0.8 |

TABLE 11-continued

| Resin constitution | Item | Unit | Examples 7 | 8 | 9 |
|---|---|---|---|---|---|
| | Amount | Parts by weight | 100 | 100 | 100 |
| Maleic anhydride | Amount | Parts by weight | 0.8 | 0.8 | 0.8 |
| Radical initiator | Amount | Parts by weight | 0.02 | 0.02 | 0.02 |
| Modified polyethylene (X) | Type | — | X-2 | X-2 | X-2 |
| | Density | g/cm$^3$ | 0.950 | 0.950 | 0.950 |
| | MFR | g/10 min | 0.15 | 0.15 | 0.15 |
| | Graft rate | wt % | 0.55 | 0.55 | 0.55 |
| | Proportion | wt % | 53 | 71 | 53 |
| Polyethylene B | Type | — | B6' | B6' | B6' |
| | Density | g/cm$^3$ | 0.927 | 0.927 | 0.927 |
| | HL-MFR | g/10 min | 0.22 | 0.22 | 0.22 |
| | Proportion | wt % | 47 | 47 | 47 |
| Polyethylene C | Type | — | C6' | C6' | C6' |
| | Density | g/cm$^3$ | 0.968 | 0.968 | 0.968 |
| | MFR | g/10 min | 180 | 180 | 180 |
| | Proportion | wt % | 53 | 53 | 53 |
| Unmodified polyethylene (Y) | Type | — | Y1-8 | Y1-8 | Y1-8 |
| | Density | g/cm$^3$ | 0.950 | 0.950 | 0.950 |
| | MFR | g/10 min | 0.08 | 0.08 | 0.08 |
| | MFRR | — | 125 | 125 | 125 |
| | Proportion | wt % | 47 | 29 | 47 |
| (X) + (Y) | Proportion | Parts by weight | 100 | 100 | 100 |
| Polyethylene D | Type | — | D2 | D2 | D3 |
| | Density | g/cm$^3$ | 0.918 | 0.918 | 0.912 |
| | MFR | g/10 min | 2.2 | 2.2 | 2.3 |
| | Proportion | wt % | 33 | 43 | 33 |
| Modified polyethylene resin composition (Z) | Density | g/cm$^3$ | 0.941 | 0.940 | 0.940 |
| | MFR | g/10 min | 0.33 | 0.37 | 0.34 |
| Gasoline permeation rate | | mg/cm$^2$ · 24 hr | 46 | 47 | 47 |
| Full notch creep rupture time (FNCT) | | hr | >500 | >500 | >500 |
| Bond strength | | N/6 mm | 91 | 104 | 115 |

As is evident from Tables 9 and 11, Examples 1 to 6 within the scope of the present invention are excellent in the gasoline permeation rate and the full notch creep rupture time. Particularly in a case where as component D, a polyethylene resin (D) by a single site type catalyst is employed as shown in Examples 7 to 9, the gasoline permeation rate is low, and the full notch creep rupture time and the bond strength are remarkably improved, and the product is a well balanced material as a welding material and is capable of presenting an excellent attachment or fuel tank.

Comparative Example 1

50 wt % of the modified polyethylene resin (X-1) and 50 wt % of a commercially available high density polyethylene (D1) (Novatec HE122R, manufactured by Japan Polyethylene Corporation) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a welding material as disclosed in Table 4. The gasoline permeation rate, the full notch creep rupture time and the bond strength were measured, and the results are shown in Table 12.

Comparative Example 2

50 wt % of the modified polyethylene resin (X-1) and 50 wt % of the unmodified polyethylene resin (Y1-6) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (Z) as the welding material, the gasoline permeation rate, the full notch creep rupture time and the bond strength were measured or evaluated. The results are shown in Table 12.

Comparative Example 3

50 wt % of the modified polyethylene resin (X-1) disclosed in Example 1 and 50 wt % of the unmodified polyethylene resin (Y1-7) were mixed, and further, to 100 parts by weight of the mixture, 0.1 part by weight of pentaerythritol tetrakis [3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin (Z) as a welding material, the gasoline permeation rate, the full notch creep rupture time and the bond strength were measured and evaluated. The results are shown in Table 12.

Comparative Example 4

With respect to commercially available Adtex FT61AR3 manufactured by Japan Polyethylene Corporation, as a welding material for a plastic fuel tank, the gasoline permeation rate and the full notch creep rupture time were measured. The results are shown in Table 12.

Comparative Example 5

With respect to commercially available Adtex DH4100 manufactured by Japan Polyethylene Corporation, as a welding material for a plastic fuel tank, the gasoline permeation rate and the full notch creep rupture time were measured. The results are shown in Table 12.

Comparative Example 6

With respect to commercially available Modic H511 manufactured by Mitsubishi Chemical Corporation, as a welding material for a plastic fuel tank, the gasoline permeation rate and the full notch creep rupture time were measured. The results are shown in Table 12.

TABLE 12

| Resin constitution | Item | Unit | Comparative Examples 1 | 2 | 3 | 4 | 5 | 6 |
|---|---|---|---|---|---|---|---|---|
| Polyethylene A | Type | — | A1 | A1 | A1 | Adtex FT61AR3 | Adtex DH4100 | Modic H511 |
| | Density | g/cm³ | 0.932 | 0.932 | 0.932 | | | |
| | MFR | g/10 min | 3.2 | 3.2 | 3.2 | | | |
| | Amount | Parts by weight | 100 | 100 | 100 | | | |
| Maleic anhydride | Amount | Parts by weight | 0.6 | 0.6 | 0.6 | | | |
| Radical initiator | Amount | Parts by weight | 0.02 | 0.02 | 0.02 | | | |
| Modified polyethylene (X) | Type | — | X-1 | X-1 | X-1 | | | |
| | Density | g/cm³ | 0.932 | 0.932 | 0.932 | | | |
| | MFR | g/10 min | 2.1 | 2.1 | 2.1 | | | |
| | Graft rate | wt % | 0.42 | 0.42 | 0.42 | | | |
| | Proportion | wt % | 100 | 50 | 50 | | | |
| Polyethylene B | Type | — | — | B4' | B5' | | | |
| | Density | g/cm³ | — | 0.930 | 0.929 | | | |
| | HL-MFR | g/10 min | — | 30 | 0.27 | | | |
| | Proportion | wt % | — | 50 | 46 | | | |
| Polyethylene C | Type | — | — | C4' | C5' | | | |
| | Density | g/cm³ | — | 0.961 | 0.963 | | | |
| | MFR | g/10 min | — | 5 | 320 | | | |
| | Proportion | wt % | — | 50 | 54 | | | |
| Unmodified polyethylene (Y) | Type | — | — | Y1-6 | Y1-7 | | | |
| | Density | g/cm³ | — | 0.945 | 0.947 | | | |
| | MFR | g/10 min | — | 2.4 | 0.05 | | | |
| | MFRR | — | — | 47 | 290 | | | |
| | Proportion | wt % | — | 50 | 50 | | | |
| (X) + (Y) | Proportion | Parts by weight | 100 | 100 | 100 | | | |
| Polyethylene D | Type | — | D1 | | | | | |
| | Density | g/cm³ | 0.939 | | | | | |
| | MFR | g/10 min | 0.20 | | | | | |
| | Proportion | wt % | 100 | | | | | |
| Modified polyethylene resin composition (Z) | Density | g/cm³ | 0.935 | 0.943 | 0.939 | 0.933 | 0.938 | 0.938 |
| | MFR | g/10 min | 0.61 | 2.2 | 0.27 | 0.58 | 0.61 | 0.42 |
| Gasoline permeation rate | | mg/cm² · 24 hr | 68 | 44 | 64 | 79 | 64 | 63 |
| Full notch creep rupture time (FNCT) | | hr | >500 | 2 | >500 | 80 | >500 | 0.4 |
| Bond strength | | N/6 mm | 81 | 80 | 80 | 108 | 80 | 72 |

Evaluation Results

As shown in Table 12, in Comparative Examples 1 and 2, the density and MFR of the modified polyethylene resin composition (Y) were outside the scope of the present invention. In Comparative Example 1, the gasoline permeation rate was large and exceeded 50 mg/cm²·24 hr. In Comparative Example 2, the full notch creep rupture time (FNCT) was short. In Comparative Example 3, the melt flow rate ratio of the unmodified polyethylene resin (Y) was outside the range of the present invention, and with this material, the gasoline permeation rate was large and exceeded 50 mg/cm²·24 hr. Comparative Examples 4 to 6 represent commercially available materials, and with each of them, the gasoline permeation rate was large and exceeded 50 mg/cm²·24 hr.

Preparation Example 14

(1) In accordance with Example 1 in JP-B-2-35766, ethylene and butene-1 were copolymerized by slurry polymerization by means of a Ziegler catalyst by adjusting the feeding amounts of a comonomer and hydrogen to obtain a linear low density polyethylene resin (C7') having a MFR of 16 g/10 min and a density of 0.922 g/cm³.

(2) Production of Unmodified Polyethylene Resin (Y1-9)

50 wt % of the linear low density polyethylene resin (B1') and 50 wt % of the linear low density polyethylene resin (C7') were blended to obtain an unmodified polyethylene resin (Y1-9) having a melt flow rate ratio of 85. The results are shown in Table 13.

TABLE 13

| | Component B Component (B1') | | | Component C Component (C7') | | | Unmodified polyethylene resin (Y1-9) | | HL-MFR/ MFR/ |
|---|---|---|---|---|---|---|---|---|---|
| | Density g/cm³ | HL-MFR g/10 min | Proportion wt % | Density g/cm³ | MFR g/10 min | Proportion wt % | Density g/cm³ | MFR g/10 min | (—) |
| | 0.927 | 2.2 | 50 | 0.922 | 16 | 50 | 0.925 | 0.15 | 85 |

Production of Unmodified Polyethylene Resin (Y1-10)

20 wt % of the linear low density polyethylene resin (B2') and 80 wt % of the high density polyethylene resin (C2') were mixed to obtain an unmodified polyethylene resin (Y1-10). The unmodified polyethylene resin (Y1-10) had a melt flow rate ratio of 95. The results are shown in Table 14.

TABLE 14

| Component B Component (B2') | | | Component C Component (C2') | | | Unmodified polyethylene resin (Y1-10) | | | HL-MFR/ MFR |
|---|---|---|---|---|---|---|---|---|---|
| Density $g/cm^3$ | HL-MFR $g/10$ min | Proportion wt % | Density $g/cm^3$ | MFR $g/10$ min | Proportion wt % | Density $g/cm^3$ | MFR $g/10$ min | (—) | |
| 0.927 | 0.23 | 20 | 0.967 | 280 | 80 | 0.956 | 1.1 | 95 | |

Production of Unmodified Polyethylene Resin (Y1-11)

70 wt % of the linear low density polyethylene resin (B1') and 30 wt % of the high density polyethylene (C11) were mixed to obtain an unmodified polyethylene resin (Y1-11). The unmodified polyethylene resin (Y1-11) had a melt flow rate ratio of 79. The results are shown in Table 15.

of the high density polyethylene resin (C1') in the above Preparation Example 5, ethylene and butene-1 were copolymerized by slurry polymerization by adjusting the feeding amounts of a comonomer and hydrogen to obtain a high density polyethylene resin (C8') having a MFR of 700 g/10 min and a density of 0.967 $g/cm^3$.

(3) Production of Unmodified Polyethylene Resin (Y1-12)

52 wt % of the linear low density polyethylene resin (B7') and 48 wt % of the high density polyethylene (C8') were mixed to obtain an unmodified polyethylene resin (Y1-12). The unmodified polyethylene resin (Y1-12) had a melt flow rate ratio of 188. The results are shown in Table 16.

TABLE 15

| Component B Component (B2') | | | Component C Component (C2') | | | Unmodified polyethylene resin (Y1-11) | | | HL-MFR/ MFR |
|---|---|---|---|---|---|---|---|---|---|
| Density $g/cm^3$ | HL-MFR $g/10$ min | Proportion wt % | Density $g/cm^3$ | MFR $g/10$ min | Proportion wt % | Density $g/cm^3$ | MFR $g/10$ min | (—) | |
| 0.927 | 2.2 | 70 | 0.963 | 100 | 30 | 0.938 | 0.13 | 79 | |

Preparation Example 15

(1) In accordance with the disclosure in Example 1 in JP-B-2-35766, ethylene and butene-1 were copolymerized by slurry polymerization by means of a Ziegler catalyst by adjusting the feeding amounts of a comonomer and hydrogen, to obtain a linear low density polyethylene resin (B7') having a HL-MFR of 0.27 g/10 min and a density of 0.929 $g/cm^3$.

(2) On the other hand, with respect to the high density polyethylene resin (C8'), in accordance with the production

TABLE 16

| Component B Component (B7') | | | Component C Component (C8') | | | Unmodified polyethylene resin (Y1-12) | | | HL-MFR/ MFR |
|---|---|---|---|---|---|---|---|---|---|
| Density $g/cm^3$ | HL-MFR $g/10$ min | Proportion wt % | Density $g/cm^3$ | MFR $g/10$ min | Proportion wt % | Density $g/cm^3$ | MFR $g/10$ min | (—) | |
| 0.929 | 0.27 | 52 | 0.967 | 700 | 48 | 0.946 | 0.08 | 188 | |

Comparative Example 7

50 wt % of the modified polyethylene resin (X-2) and 50 wt % of the unmodified polyethylene resin (Y1-9) were mixed, and further, to 100 parts by weight of the mixture, 0.1 part by weight of pentaerythritol tetrakis[3-(3,5-di-t-butyl-4-hydroxyphenyl)propionate], 0.1 part of octadecyl-3-(3,5-di-t-butyl-4-hydroxyphenyl)propionate, 0.1 part by weight of tris(2,4-di-t-butylphenyl)phosphite and 0.05 part of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 17.

Comparative Example 8

50 wt % of the modified polyethylene resin (X-1) and 50 wt % of the unmodified polyethylene resin (Y1-10) were mixed, and further, to 100 parts by weight of the mixture, 0.1 part of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by means of a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 17.

Comparative Example 9

50 wt % of the modified polyethylene resin (X-1) and 50 wt % of the unmodified polyethylene resin (Y1-11) were mixed, and further, to 100 parts by weight of the mixture, 0.1 part of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were mixed, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 17.

Comparative Example 10

50 wt % of the modified polyethylene resin (X-1) and 50 wt % of the unmodified polyethylene resin (Y1-12) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 17.

TABLE 17

| Resin constitution | Item | Unit | Comparative Examples | | | |
|---|---|---|---|---|---|---|
| | | | 7 | 8 | 9 | 10 |
| Polyethylene A | Type | — | A2 | A1 | A1 | A1 |
| | Density | g/cm³ | 0.950 | 0.932 | 0.932 | 0.932 |
| | MFR | g/10 min | 0.8 | 3.2 | 3.2 | 3.2 |
| | Amount | Parts by weight | 100 | 100 | 100 | 100 |
| Maleic anhydride | Amount | Parts by weight | 0.8 | 0.6 | 0.6 | 0.6 |
| Radical initiator | Amount | Parts by weight | 0.02 | 0.02 | 0.02 | 0.02 |
| Modified polyethylene (X) | Type | — | X-2 | X-1 | X-1 | X-1 |
| | Density | g/cm³ | 0.950 | 0.932 | 0.932 | 0.932 |
| | MFR | g/10 min | 0.15 | 2.1 | 2.1 | 2.1 |
| | Graft rate | wt % | 0.55 | 0.42 | 0.42 | 0.42 |
| | Proportion | wt % | 50 | 50 | 50 | 50 |
| Polyethylene B | Type | — | B1' | B2' | B1' | B7' |
| | Density | g/cm³ | 0.927 | 0.927 | 0.927 | 0.929 |
| | HL-MFR | g/10 min | 2.2 | 0.23 | 2.2 | 0.27 |
| | Proportion | wt % | 50 | 20 | 70 | 52 |
| Polyethylene C | Type | — | C7' | C2' | C1' | C8' |
| | Density | g/cm³ | 0.922 | 0.967 | 0.963 | 0.967 |
| | MFR | g/10 min | 16 | 280 | 100 | 700 |
| | Proportion | wt % | 50 | 80 | 30 | 48 |

TABLE 17-continued

| Resin constitution | Item | Unit | Comparative Examples | | | |
|---|---|---|---|---|---|---|
| | | | 7 | 8 | 9 | 10 |
| Unmodified polyethylene (Y) | Type | — | Y1-9 | Y1-10 | Y1-11 | Y1-12 |
| | Density | g/cm$^3$ | 0.925 | 0.956 | 0.938 | 0.946 |
| | MFR | g/10 min | 0.15 | 1.1 | 0.13 | 0.08 |
| | MFRR | — | 85 | 95 | 79 | 188 |
| | Proportion | wt % | 50 | 50 | 50 | 50 |
| (X) + (Y) | Proportion | Parts by weight | 100 | 100 | 100 | 100 |
| Modified polyethylene resin composition (Z) | Density | g/cm$^3$ | 0.936 | 0.944 | 0.935 | 0.939 |
| | MFR | g/10 min | 0.14 | 1.5 | 0.37 | 0.30 |
| Gasoline permeation rate | | mg/cm$^2$ · 24 hr | 55 | 42 | 68 | 68 |
| Full notch creep rupture time (FNCT) | | hr | 59 | 16 | 80 | >500 |
| Bond strength | | N/6 mm | 77 | 77 | 75 | 75 |

Evaluation Results

As shown in Table 17, in Comparative Example 7, the density (y1) of the unmodified polyethylene resin (Y) was outside the scope of the present invention, and the gasoline permeation rate exceeded 50 mg/cm$^2$·24 hr. Further, in Comparative Examples 8 and 9, the blend proportions of the polyethylene resins B and C were outside the scope of the present invention. As in Comparative Example 8, in a case where the proportion of polyethylene A was small, the full notch creep rupture time was short, and as in Comparative Example 9, when it was too much, the gasoline permeation rate tended to be large, and in each case, it was impossible to obtain the material intended by the present invention.

Further, in a case where the upper limit of MFR of the polyethylene resin B was outside the scope of the present invention, the gasoline permeation rate was large.

Comparative Example 11

50 wt % of the modified polyethylene resin (X-1) and 50 wt % of the high density polyethylene resin (Y1-13) used in Examples in WO2002079323A1 (density: 0.956 g/cm$^3$, MFR: 0.8 g/10 min, a Ziegler catalyst was used, melt flow rate ratio: 30, J-REX-HD, manufactured by Japan Polyolefins Co., Ltd.) as an unmodified polyethylene resin, were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part of hydrotalcite were added, followed by blending for two minutes by a Henschel mixer. Then, the mixture was kneaded by means of a 50 mm single screw extruder manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 18.

Comparative Example 12

50 wt % of the modified polyethylene resin (X-2) and 50 wt % of a high density polyethylene resin (Y1-13) used in Examples in WO2002079323A1 (density: 0.956 g/cm$^3$, MFR: 0.8 g/10 min, a Ziegler catalyst was used, melt flow rate ratio: 30, J-REX-HD, manufactured by Japan Polyolefins Co., Ltd.) as an unmodified polyethylene resin, were mixed, and further, to 100 parts by weight of the mixture, 33 parts by weight of the single site type polyethylene resin (D2), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured and evaluated. The results are shown in Table 18.

Comparative Example 13

0.3 wt % of the modified polyethylene resin (X-1) and 99.7 wt % of (Y1-1) as an unmodified polyethylene resin, were mixed, and further, to 100 parts by weight of the mixture, 0.1 part of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part of hydrotalcite were added, followed by blending for two minutes by a Henschel mixer. Then, the mixture was kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (z) as a welding material, the gasoline permeation rate, the full notch creep rupture time and the bond strength were measured or evaluated. The results are shown in Table 18.

Comparative Example 14

97 wt % of the modified polyethylene resin (X-1) and 3 wt % of (Y1-8) as an unmodified polyethylene resin, were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). Using the modified polyethylene resin composition (Z) as a welding material, the gasoline permeation rate, the full notch creep rupture time and the bond strength were measured or evaluated. The results are shown in Table 18.

TABLE 18

| Resin constitution | Item | Unit | Comparative Examples 11 | 12 | 13 | 14 |
|---|---|---|---|---|---|---|
| Polyethylene A | Type | — | A1 | A2 | A1 | A1 |
| | Density | g/cm$^3$ | 0.932 | 0.950 | 0.932 | 0.932 |
| | MFR | g/10 min | 3.2 | 0.8 | 3.2 | 3.2 |
| | Amount | Parts by weight | 100 | 100 | 100 | 100 |
| Maleic anhydride | Amount | Parts by weight | 0.6 | 0.8 | 0.6 | 0.6 |
| Radical initiator | Amount | Parts by weight | 0.02 | 0.02 | 0.02 | 0.02 |
| Modified polyethylene (X) | Type | — | X-1 | X-2 | X-1 | X-1 |
| | Density | g/cm$^3$ | 0.932 | 0.950 | 0.932 | 0.932 |
| | MFR | g/10 min | 2.1 | 0.15 | 2.1 | 2.1 |
| | Graft rate | wt % | 0.42 | 0.55 | 0.42 | 0.42 |
| | Proportion | wt % | 50 | 50 | 0.3 | 97 |
| Polyethylene B | Type | — | | | B1' | B6' |
| | Density | g/cm$^3$ | | | 0.927 | 0.927 |
| | HL-MFR | g/10 min | | | 2.2 | 0.22 |
| | Proportion | wt % | | | 50 | 47 |
| Polyethylene C | Type | — | | | C1' | C6' |
| | Density | g/cm$^3$ | | | 0.963 | 0.968 |
| | MFR | g/10 min | | | 100 | 180 |
| | Proportion | wt % | | | 50 | 53 |
| Unmodified polyethylene (Y) | Type | — | Y1-13 | Y1-13 | Y1-1 | Y1-8 |
| | Density | g/cm$^3$ | 0.956 | 0.956 | 0.945 | 0.950 |
| | MFR | g/10 min | 0.8 | 0.8 | 0.31 | 0.08 |
| | MFRR | — | 30 | 30 | 103 | 125 |
| | Proportion | wt % | 50 | 50 | 99.7 | 3 |
| (X) + (Y) | Proportion | Parts by weight | 100 | 100 | 100 | 100 |
| Polyethylene D | Type | — | | D2 | | |
| | Density | g/cm$^3$ | | 0.918 | | |
| | MFR | g/10 min | | 2.2 | | |
| | Proportion | Parts by weight | | 33 | | |
| Modified polyethylene resin composition (Z) | Density | g/cm$^3$ | 0.943 | 0.942 | 0.944 | 0.934 |
| | MFR | g/10 min | 1.4 | 0.58 | 0.31 | 1.9 |
| Gasoline permeation rate | | mg/cm$^2$ · 24 hr | 45 | 48 | 42 | 77 |
| Full notch creep rupture time (FNCT) | | hr | 4 | 25 | 65 | 8 |
| Bond strength | | N/6 mm | 75 | 90 | 14 | 75 |

Evaluation Results

Comparative Examples 11 and 12 in Table 18 are directed to materials wherein as an unmodified polyethylene resin, a high density polyethylene resin used in Examples in WO2002079323A1 (Density: 0.956 g/cm$^3$, MFR: 0.8 g/10 min, a Ziegler catalyst was used, melt flow rate ratio: 30) was used, and further, as the polyethylene resin component D, a single site type polyethylene resin was used, and they correspond to duplicate tests of such materials.

However, the material in the above Comparative Example 11 was outside the scope of the present invention, as the melt flow rate ratio of the unmodified polyethylene resin was 30, and thus the molecular weight distribution was narrow, whereby the full notch creep rupture time was very short. Further, also in Comparative Example 12, the full notch creep rupture time was improved by incorporating a single site type polyethylene resin as a polyethylene resin component D further to Comparative Example 11, but it still did not satisfy the property intended by the present invention i.e. (z4) the full notch creep rupture time being at least 50 hours.

Comparative Examples 13 and 14 are Examples wherein the blend proportions of the modified polyethylene resin (X) and the unmodified polyethylene resin (Y) were outside the scope of the present invention. In Comparative Example 13 wherein the proportion of the modified polyethylene resin (X) was small, the bond strength was low, and when the proportion of the modified polyethylene resin (X) was too large, the full notch creep rupture time was very short.

Production of Modified Polyethylene Resin (X)

Preparation Example 16

Production of Modified Polyethylene Resin (X-4)

In accordance with the disclosure in Example 5 in JP-A-10-29824, ethylene and butene-1 were copolymerized by slurry polymerization by means of a Ziegler catalyst to obtain a powdery linear low density polyethylene resin (A4) having a MFR of 0.05 g/10 min and a density of 0.923 g/cm$^3$.

To 100 parts by weight of the above powdery linear low density polyethylene resin (A4), 0.6 part of maleic anhydride and 0.02 part of 2,5-dimethyl-di-(t-butylperoxy)hexane were added, followed by mixing by a Henschel mixer. Then, the mixture was melt-kneaded by means of a 50 mm single screw extruder manufactured by Modern Machinery K.K. under such conditions that the screw rotational speed was 50 rpm and the resin temperature was 280° C., to obtain a modified polyethylene resin (X-4) having a MFR of 0.01 g/10 min, a density of 0.923 g/cm$^3$ and a graft rate of 0.42 wt %.

Preparation Example 17

Production of Modified Polyethylene Resin (X-5)

In accordance with the disclosure in Example 5 in JP-A-10-29824, ethylene and butene-1 were copolymerized by slurry polymerization by means of a Ziegler catalyst to obtain a powdery linear low density polyethylene resin (A5) having a MFR of 9.0 g/10 min and a density of 0.925 g/cm$^3$.

To 100 parts by weight of the powdery linear low density polyethylene resin (A5), 0.8 part of maleic anhydride and 0.02 part by weight of 2,5-dimethyl-di-(t-butylperoxy) hexane were added, followed by mixing by a Henschel mixer. Then, the mixture was melt-kneaded by means of a 50 mm single screw extruder manufactured by Modern Machinery K.K. under such conditions that the screw rotational speed was 50 rpm and the resin temperature was 280° C., to obtain a modified polyethylene resin (X-5) having a MFR of 4.0 g/10 min, a density of 0.925 g/cm$^3$ and a graft rate of 0.56 wt %.

Preparation Example 18

Production of Modified Polyethylene Resin (X-6)

In accordance with the disclosure in Example 5 in JP-A-10-29824, ethylene and butene-1 were copolymerized by slurry polymerization by means of a Ziegler catalyst to obtain a powdery linear low density polyethylene resin (A6) having a MFR of 2.0 g/10 min and a density of 0.905 g/cm$^3$.

To 100 parts by weight of the powdery linear low density polyethylene resin (A6), 0.8 part by weight of maleic anhydride and 0.02 part by weight of 2,5-dimethyl-di-(t-butylperoxy)hexane were added, followed by mixing by a Henschel mixer. Then, the mixture was melt-kneaded by means of a 50 mm single screw extruder manufactured by Modern Machinery K.K. under such conditions that the screw rotational speed was 50 rpm and the resin temperature was 280° C., to obtain a modified polyethylene resin (X-6) having a MFR of 0.88 g/10 min, a density of 0.905 g/cm$^3$ and a graft rate of 0.57 wt %.

Comparative Example 15

15 wt % of the modified polyethylene resin (X-4) and 85 wt % of (Y1-1) as an unmodified polyethylene resin, were mixed, and to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 19.

Comparative Example 16

50 wt % of the modified polyethylene resin (X-5) and 50 wt % of (Y1-1) as an unmodified polyethylene resin, were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). By using the modified polyethylene resin composition (Z) as a welding material, the gasoline permeation rate, the full notch creep rupture time and the bond strength were measured or evaluated. The results are shown in Table 19.

Comparative Example 17

15 wt % of the modified polyethylene resin (X-6) and 85 wt % of (Y1-1) as an unmodified polyethylene resin, were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder, manufactured by Modern Machinery K.K. under such conditions that the screw rotational speed was 80 rpm and the resin temperature was 230° C., to obtain a modified polyethylene resin composition (Z). Using the modified polyethylene resin composition (Z) as a welding material, the gasoline permeation rate, the full notch creep rupture time and the bond strength were measured or evaluated. The results are shown in Table 19.

TABLE 19

| Resin constitution | Item | Unit | Comparative Examples | | |
|---|---|---|---|---|---|
| | | | 15 | 16 | 17 |
| Polyethylene A | Type | — | A4 | A5 | A6 |
| | Density | g/cm$^3$ | 0.923 | 0.925 | 0.905 |
| | MFR | g/10 min | 0.05 | 9.0 | 2 |
| | Amount | Parts by weight | 100 | 100 | 100 |
| Maleic anhydride | Amount | Parts by weight | 0.6 | 0.8 | 0.8 |
| Radical initiator | Amount | Parts by weight | 0.02 | 0.02 | 0.02 |
| Modified polyethylene (X) | Type | — | X-4 | X-5 | X-6 |
| | Density | g/cm$^3$ | 0.923 | 0.925 | 0.905 |
| | MFR | g/10 min | 0.01 | 4.0 | 0.88 |
| | Graft rate | wt % | 0.42 | 0.56 | 0.57 |
| | Proportion | wt % | 15 | 50 | 15 |
| Polyethylene B | Type | — | B1' | B1' | B1' |
| | Density | g/cm$^3$ | 0.927 | 0.927 | 0.927 |
| | HL-MFR | g/10 min | 2.2 | 2.2 | 2.2 |
| | Proportion | wt % | 50 | 50 | 50 |
| Polyethylene C | Type | — | C1' | C1' | C1' |
| | Density | g/cm$^3$ | 0.963 | 0.963 | 0.963 |
| | MFR | g/10 min | 100 | 100 | 100 |
| | Proportion | wt % | 50 | 50 | 50 |
| Unmodified polyethylene (Y) | Type | — | Y1-1 | Y1-1 | Y1-1 |
| | Density | g/cm$^3$ | 0.945 | 0.945 | 0.945 |
| | MFR | g/10 min | 0.31 | 0.31 | 0.31 |
| | MFRR | — | 103 | 103 | 103 |
| | Proportion | wt % | 85 | 50 | 85 |
| (X) + (Y) | Proportion | Parts by weight | 100 | 100 | 100 |
| Modified polyethylene resin composition (Z) | Density | g/cm$^3$ | 0.941 | 0.945 | 0.939 |
| | MFR | g/10 min | 0.14 | 1.5 | 0.39 |
| Gasoline permeation rate | | mg/cm$^2$ · 24 hr | 46 | 42 | 48 |
| Full notch creep rupture time (FNCT) | | hr | 30 | 10 | 25 |
| Bond strength | | N/6 mm | 76 | 58 | 58 |

Evaluation Results

In Comparative Examples 15 to 17, the density and MFR of the polyethylene resin (A) as a raw material resin for the modified polyethylene resin (X) were outside the scope of the present invention, and the physical properties were evaluated, whereby in each case, the full notch creep rupture time (FNCT) did not satisfy the desired value of at least 50 hours.

Production of Unmodified Polyethylene Resin (Y2)

(Y2-1) to (Y2-4) were produced by the following preparation Examples 19 to 24.

Preparation Example 19

(i) Preparation of Solid Catalyst

A commercially available chromium oxide catalyst supported on silica (969ID, manufactured by Grace Company) was transferred to a firing tube at room temperature, dried under nitrogen and then fired at 600° C. for 30 hours in dry air, whereupon it was returned to room temperature under nitrogen to obtain a solid catalyst having good flowability.

(ii) Slurry Polymerization

Using a continuous slurry polymerization apparatus, copolymerization of ethylene and 1-hexene was carried out at a polymerization temperature of 100° C. under a total pressure of 4.4 MPa in an isobutane solvent. The above solid catalyst was continuously supplied, and polymerization was carried out by supplying ethylene and 1-hexene so that they maintained a prescribed molar ratio, to obtain a powdery polyethylene resin (Y2-1) having a MFR of 0.05 g/10 min, a density of 0.945 g/cm$^3$ and a melt flow rate ratio (hereinafter referred to as MFR ratio) of 132. The results are shown in Table 11.

Preparation Example 20

(i) Preparation of Solid Catalyst

A commercially available chromium oxide catalyst supported on silica (969MSB, manufactured by Grace Company) was transferred to a firing tube at room temperature, dried under nitrogen and then fired at 730° C. for 18 hours in dry air, whereupon it was returned to room temperature under nitrogen to obtain a solid catalyst having good flowability.

(ii) Slurry Polymerization

Using a continuous slurry polymerization apparatus, copolymerization of ethylene and 1-hexene was carried out at a polymerization temperature of 98° C. under a total pressure of 4.4 MPa in an isobutane solvent. The above solid catalyst was continuously supplied, and polymerization was carried out by supplying ethylene and 1-hexene so that they maintained a prescribed molar ratio, to obtain a powdery polyethylene resin (Y2-2) having a MFR of 0.22 g/10 min, a density of 0.942 g/cm$^3$ and a MFR ratio of 105. The results are shown in Table 20.

Preparation Example 21

(i) Preparation of Solid Catalyst

A commercially available chromium oxide catalyst supported on silica-titania cogel (Magnapore 963, manufactured by Grace Company) was transferred to a firing tube at room temperature, dried under nitrogen and then fired at 820° C. for 12 hours in dry air, whereupon it was returned to room temperature under nitrogen to obtain a solid catalyst having good flowability.

(ii) Slurry Polymerization

Using a continuous slurry polymerization apparatus, copolymerization of ethylene and 1-hexene was carried out at a polymerization temperature of 86° C. under a total pressure of 4.4 MPa in an isobutane solvent. The solid catalyst was continuously supplied, and polymerization was carried out by supplying ethylene and 1-hexene so that they maintained a prescribed molar ratio, to obtain a powdery polyethylene resin (Y2-3) having a MFR of 0.21 g/10 min, a density of 0.938 g/cm$^3$ and a MFR ratio of 101. The results are shown in Table 20.

Preparation Example 22

(i) Preparation of Solid Catalyst

A commercially available chromium oxide catalyst supported on silica (EP30X, manufactured by Grace Company) was transferred to a firing tube at room temperature, dried under nitrogen and then fired at 820° C. for 18 hours in dry air, whereupon it was returned to room temperature under nitrogen to obtain a solid catalyst having good flowability.

(ii) Slurry Polymerization

Using a continuous slurry polymerization apparatus, copolymerization of ethylene and 1-hexene was carried out at a polymerization temperature of 108° C. under a total pressure of 4.4 MPa in an isobutane solvent. The above solid catalyst was continuously supplied, and polymerization was carried out by supplying ethylene and 1-hexene so that they maintained a prescribed molar ratio, to obtain a powdery polyethylene resin (Y2-4) having a MFR of 0.85 g/10 min, a density of 0.958 g/cm$^3$ and a MFR ratio of 71. The results are shown in Table 20.

TABLE 20

| | | | Names of resins | | | |
|---|---|---|---|---|---|---|
| | | Unit | Y2-1 | Y2-2 | Y2-3 | Y2-4 |
| Preparation Example No. | | — | Preparation Example 19 | Preparation Example 20 | Preparation Example 21 | Preparation Example 22 |
| Catalyst | Catalyst name | — | Grace 969ID | Grace 969MSB | Grace Magnapore 963 | Grace EPX30X |
| | Activation temperature | ° C. | 600 | 730 | 820 | 820 |
| | Activation time | hr | 30 | 18 | 12 | 18 |
| Polymerization conditions | Polymerization method | — | Slurry polymerization | Slurry polymerization | Slurry polymerization | Slurry polymerization |
| | Solvent | — | Isobutane | Isobutane | Isobutane | Isobutane |
| | Polymerization temperature | ° C. | 100 | 98 | 86 | 108 |
| | Pressure | MPa | 4.4 | 4.4 | 4.4 | 4.4 |
| Physical properties of resin | Density | g/cm$^3$ | 0.945 | 0.942 | 0.938 | 0.956 |
| | MFR | g/10 min | 0.05 | 0.22 | 0.21 | 0.85 |
| | HL-MFR | g/10 min | 6.6 | 23.1 | 21.2 | 60.4 |
| | MFR ratio | — | 132 | 105 | 101 | 71 |

Example 10

50 wt % of the modified polyethylene resin (X-1) and 50 wt % of the polyethylene resin (Y2-1) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 21.

Example 11

40 wt % of the modified polyethylene resin (X-1) and 60 wt % of the polyethylene resin (Y2-2) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 21.

Example 12

40 wt % of the modified polyethylene resin (X-2) and 60 wt % of the polyethylene resin (Y2-3) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain the welding material. Its physical properties were measured, and the results are shown in Table 21.

Example 13

67 wt % of the modified polyethylene resin (X-1) and 33 wt % of the polyethylene resin (Y2-3) were mixed, and further, to 100 parts by weight of the mixture, 33 parts by weight of a commercially available unmodified polyethylene resin (Novatec HB534N, manufactured by Japan Polyethylene Corporation) (D4), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 21.

Example 14

57 wt % of the modified polyethylene resin (X-1) and 43 wt % of the polyethylene resin (Y2-3) were mixed, and further, to 100 parts by weight of the mixture, 43 parts by weight of a commercially available unmodified polyethylene resin (Novatec HB534N, manufactured by Japan Polyethylene Corporation) (D4), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 21.

of a commercially available unmodified polyethylene resin (Novatec HB334R, manufactured by Japan Polyethylene Corporation) (D5), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 21.

TABLE 21

| Resin constitution | Item | Unit | Examples 10 | 11 | 12 | 13 | 14 | 15 |
|---|---|---|---|---|---|---|---|---|
| Polyethylene A | Type | — | A1 | A1 | A2 | A1 | A1 | A1 |
| | Density | g/cm$^3$ | 0.932 | 0.932 | 0.951 | 0.932 | 0.932 | 0.932 |
| | MFR | g/10 min | 3.2 | 3.2 | 0.8 | 3.2 | 3.2 | 3.2 |
| | Amount | Parts by weight | 100 | 100 | 100 | 100 | 100 | 100 |
| Maleic anhydride | Amount | Parts by weight | 0.6 | 0.6 | 0.8 | 0.6 | 0.6 | 0.6 |
| Radical initiator | Amount | Parts by weight | 0.02 | 0.02 | 0.02 | 0.02 | 0.02 | 0.02 |
| Modified polyethylene (X) | Type | — | X-1 | X-1 | X-2 | X-1 | X-1 | X-1 |
| | Density | g/cm$^3$ | 0.932 | 0.932 | 0.950 | 0.932 | 0.932 | 0.932 |
| | MFR | g/10 min | 2.1 | 2.1 | 0.15 | 2.1 | 2.1 | 2.1 |
| | Graft rate | wt % | 0.42 | 0.42 | 0.55 | 0.42 | 0.42 | 0.42 |
| | Proportion | wt % | 50 | 40 | 40 | 67 | 57 | 63 |
| Unmodified polyethylene (Y) | Type | — | Y2-1 | Y2-2 | Y2-3 | Y2-3 | Y2-3 | Y2-3 |
| | Density | g/cm$^3$ | 0.945 | 0.942 | 0.938 | 0.938 | 0.938 | 0.938 |
| | MFR | g/10 min | 0.05 | 0.22 | 0.21 | 0.21 | 0.21 | 0.21 |
| | MFRR | — | 132 | 105 | 101 | 101 | 101 | 101 |
| | Proportion | wt % | 50 | 60 | 60 | 33 | 43 | 37 |
| (X) + (Y) | Proportion | Parts by weight | 100 | 100 | 100 | 100 | 100 | 100 |
| Polyethylene D | Type | — | | | | D4 | D4 | D5 |
| | Density | g/cm$^3$ | | | | 0.958 | 0.958 | 0.952 |
| | MFR | g/10 min | | | | 0.30 | 0.30 | 0.32 |
| | Proportion | wt % | | | | 33 | 43 | 25 |
| Modified polyethylene resin composition (Z) | Density | g/cm$^3$ | 0.939 | 0.939 | 0.943 | 0.940 | 0.941 | 0.938 |
| | MFR | g/10 min | 0.16 | 0.58 | 0.18 | 0.72 | 0.54 | 0.66 |
| Gasoline permeation rate | | mg/cm$^2$ · 24 hr | 47 | 47 | 43 | 46 | 46 | 48 |
| Full notch creep rupture time (FNCT) | | hr | 180 | 150 | 210 | 70 | 110 | 95 |
| Bond strength | | N/6 mm | 80 | 78 | 78 | 78 | 76 | 79 | part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 21.

Example 15

63 wt % of the modified polyethylene resin (X-1) and 37 wt % of the polyethylene resin (Y2-3) were mixed, and further, to 100 parts by weight of the mixture, 25 parts by weight Comparative Example 18

50 wt % of the modified polyethylene resin (X-1) and 50 wt % of the unmodified polyethylene resin (Y2-3) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 22.

Comparative Example 19

50 wt % of the modified polyethylene resin (X-1) and 50 wt % of the unmodified polyethylene resin (Y2-4) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 22.

Comparative Example 20

To 100 parts by weight of the modified polyethylene resin (X-1), 100 parts by weight of a commercially available unmodified polyethylene resin (Novatec HB534N, manufactured by Japan Polyethylene Corporation) (D4), 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 22.

Comparative Example 21

15 wt % of the modified polyethylene resin (X-4) and 85 wt % of the unmodified polyethylene resin (Y2-3) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 22.

Comparative Example 22

50 wt % of the modified polyethylene resin (X-5) and 50 wt % of the unmodified polyethylene resin (Y2-3) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 22.

Comparative Example 23

15 wt % of the modified polyethylene resin (X-6) and 85 wt % of the unmodified polyethylene resin (Y2-3) were mixed, and further, to 100 parts by weight of the mixture, 0.1 part by weight of pentaerythritol tetrakis[3-(3,5-di-t-butyl-4-hydroxyphenyl)propionate], 0.1 part by weight of octadecyl-3-(3,5-di-t-butyl-4-hydroxyphenyl)propionate, 0.1 part by weight of tris(2,4-di-t-butylphenyl)phosphite and 0.05 part by weight of hydrotalcite were added, followed by blending for two minutes by a Henschel mixer. Then, the mixture was melt-kneaded by means of a 50 mm single screw extruder manufactured by Modern Machinery K.K. under such conditions that the screw rotational speed was 80 rpm, and the resin temperature was 230° C., to obtain a welding material. Its physical properties were measured, and the results are shown in Table 22.

TABLE 22

| Resin constitution | Item | Unit | Comparative Examples | | | | | |
|---|---|---|---|---|---|---|---|---|
| | | | 18 | 19 | 20 | 21 | 22 | 23 |
| Polyethylene A | Type | — | A1 | A1 | A1 | A4 | A5 | A6 |
| | Density | g/cm$^3$ | 0.932 | 0.932 | 0.932 | 0.923 | 0.925 | 0.905 |
| | MFR | g/10 min | 3.2 | 3.2 | 3.2 | 0.05 | 9.0 | 2 |
| | Amount | Parts by weight | 100 | 100 | 100 | 100 | 100 | 100 |
| Maleic anhydride | Amount | Parts by weight | 0.6 | 0.6 | 0.6 | 0.6 | 0.8 | 0.8 |
| Radical initiator | Amount | Parts by weight | 0.02 | 0.02 | 0.02 | 0.02 | 0.02 | 0.02 |
| Modified polyethylene (X) | Type | — | X-1 | X-1 | X-1 | X-4 | X-5 | X-6 |
| | Density | g/cm$^3$ | 0.932 | 0.932 | 0.932 | 0.923 | 0.925 | 0.905 |
| | MFR | g/10 min | 2.1 | 2.1 | 2.1 | 0.01 | 4.0 | 0.88 |
| | Graft rate | wt % | 0.42 | 0.42 | 0.42 | 0.42 | 0.56 | 0.57 |
| | Proportion | wt % | 50 | 50 | 100 | 15 | 50 | 15 |

TABLE 22-continued

| Resin constitution | Item | Unit | Comparative Examples 18 | 19 | 20 | 21 | 22 | 23 |
|---|---|---|---|---|---|---|---|---|
| Unmodified polyethylene (Y) | Type | — | Y2-3 | Y2-4 | | Y2-3 | Y2-3 | Y2-3 |
| | Density | g/cm³ | 0.938 | 0.958 | | 0.938 | 0.938 | 0.938 |
| | MFR | g/10 min | 0.21 | 0.85 | | 0.21 | 0.21 | 0.21 |
| | MFRR | — | 101 | 71 | | 101 | 101 | 101 |
| | Proportion | wt % | 50 | 50 | | 85 | 50 | 85 |
| (X) + (Y) | Proportion | Parts by weight | 100 | 100 | 100 | 100 | 100 | 100 |
| Polyethylene D | Type | — | | | D4 | | | |
| | Density | g/cm³ | | | 0.958 | | | |
| | MFR | g/10 min | | | 0.30 | | | |
| | Proportion | wt % | | | 33 | | | |
| Modified polyethylene resin composition (Z) | Density | g/cm³ | 0.935 | 0.944 | 0.944 | 0.936 | 0.931 | 0.933 |
| | MFR | g/10 min | 0.61 | 1.4 | 0.91 | 0.11 | 1.4 | 0.29 |
| Gasoline permeation rate | | mg/cm²·24 hr | 68 | 43 | 42 | 65 | 83 | 82 |
| Full notch creep rupture time (FNCT) | | hr | >500 | 14 | 35 | >500 | 18 | >500 |
| Bond strength | | N/6 mm | 77 | 76 | 77 | 78 | 58 | 61 |

Evaluation Results

As shown in Tables 21 and 22, Examples 10 to 15 which were within the scope of the present invention provided welding materials excellent in the gasoline permeation rate, the full notch creep rupture time (FNCT) and the bond strength and such properties were well balanced. On the other hand, in Comparative Example 18, the density of the modified polyethylene resin composition (Z) was outside the scope of the present invention, and the gasoline permeation rate was high. In Comparative Example 19, MFR was outside the scope of the present invention and the full notch creep rupture time (FNCT) was short. Further, with the modified polyethylene resin (X) alone, as there was no unmodified polyethylene resin (Y) having a wide molecular weight distribution, the full notch creep rupture time (FNCT) was short, and such was not qualified as a balanced welding material. Further, Comparative Examples 21 to 23 were ones wherein MFR and the density of the polyethylene resin A as the raw material for the modified polyethylene resin (X) were outside the scope of the present invention. In Comparative Example 21, the gasoline permeation rate was poor, and particularly in Comparative Example 21, MFR of the raw material resin was very low, whereby the injection moldability at the time of molding the welding component was very poor. Further, in Comparative Examples 22 and 23, the full notch creep rupture time (FNCT) was short, and the bond strength was also low.

Industrial Applicability

The welding material of the present invention can be easily welded to a fuel tank, particularly to a plastic fuel tank and can maintain the bond strength even after being in contact with a fuel such as gasoline, and even when it is used for a long period of time in a high temperature atmosphere, it is not only capable of maintaining the good fuel permeation preventing property but also excellent in the creep rupture resistance or stress cracking resistance. When it is used as a constituting material for a fuel supply component for a fuel tank, it is possible to suppress the fuel diffusion from the joint area with the tank body, and it is capable of presenting a fuel tank excellent in the long-term performance.

The entire disclosures of Japanese Patent Application No. 2006-199087 filed on Jun. 21, 2006 and Japanese Patent Application No. 2006-199093 filed on Jun. 21, 2006 including specifications, claims and summaries are incorporated herein by reference in their entireties.

What is claimed is:

1. A fuel tank welded by a welding material comprising a modified polyethylene resin composition (Z) comprising from 0.5 to 95 wt % of modified polyethylene resin (X) and from 5 to 99.5 wt % of unmodified polyethylene resin (Y), the modified polyethylene resin composition (Z) having a density of from 0.938 to 0.965 g/cm³ and a melt flow rate (temperature: 190° C., load: 2.16 kg) of from 0.05 to 1.0 g/10 min, wherein the modified polyethylene resin (X) is a modified polyethylene resin having at least one monomer selected from the group consisting of an unsaturated carboxylic acid and derivatives thereof, grafted to a polyethylene resin (A) having a density of from 0.910 to 0.965 g/cm³ and a melt flow rate (temperature: 190° C., load: 2.16 kg) of from 0.1 to 5.0 g/10 min, wherein a grafted amount of the at least one monomer selected from the group consisting of an unsaturated carboxylic acid and derivatives thereof is within a range of from 0.001 to 5.0 wt %;

the unmodified polyethylene resin (Y) is a polyethylene resin having a density of from 0.930 to 0.965 g/cm³, a melt flow rate (temperature: 190° C., load: 2.16 kg) of from 0.01 to 5.0 g/10 min and a melt flow rate ratio (high load melt flow rate HL-MFR (temperature: 190° C., load: 21.6 kg)/melt flow rate MFR (temperature: 190° C., load: 2.16 kg)) of from 40 to 270; and the modified polyethylene resin composition (Z) has a gasoline permeation rate through a sheet of 1 mm in thickness as measured at 65° C. of at most 50 mg/cm²·24 hr, and a full notch creep rupture time under 5.5 MPa as measured at 80° C. of at least 50 hours.

2. The fuel tank according to claim 1, wherein the unmodified polyethylene resin (Y) has a melt flow rate ratio (high load melt flow rate HL-MFR (temperature: 190° C., load: 21.6 kg)/melt flow rate MFR (temperature: 190° C., load: 2.16 kg)) of from 70 to 150.

3. The fuel tank according to claim 1, wherein the unmodified polyethylene resin (Y) is a polyethylene resin composition comprising from 25 to 60 wt % of a polyethylene resin (B) having a density of from 0.910 to 0.940 g/cm³ and a high load melt flow rate (temperature: 190° C., load: 21.6 kg) of from 0.05 to 10 g/10 min, and from 40 to 75 wt % of a polyethylene resin (C) having a density of from 0.940 to 0.970 g/cm$^3$ and a melt flow rate (temperature: 190° C., load: 2.16 kg) of from 5 to 600 g/10 min.

4. The fuel tank according to claim 1, wherein the unmodified polyethylene resin (Y) is a polyethylene resin (Y) produced by multistage polymerization.

5. The fuel tank according to claim 1, wherein the welding material further comprises at most 150 parts by weight of other polyethylene resin (D) per 100 parts by weight in total of the modified polyethylene resin (X) and the unmodified polyethylene resin (Y) wherein a density of the other polyethylene resin (D) is from 0.911 to 0.965 g/cm$^3$.

6. The fuel tank according to claim 5, wherein at least one of the modified polyethylene resin (X), the unmodified polyethylene resin (Y) and said other polyethylene resin (D) is produced by a single-site catalyst.

7. The fuel tank according to claim 1, wherein the fuel tank is made of a multi-layered laminate structure comprising a main layer of a high density polyethylene, an adhesive layer and a barrier layer.

8. The fuel tank according to claim 1, wherein the unmodified polyethylene resin (Y) is a polyethylene resin composition comprising from 25 to 60 wt % of a polyethylene resin (B) having a density of from 0.910 to 0.927 g/cm$^3$ and a high load melt flow rate (temperature: 190° C., load: 21.6 kg) of from 0.05 to 10 g/10 min, and from 40 to 75 wt % of a polyethylene resin (C) having a density of from 0.940 to 0.970 g/cm$^3$ and a melt flow rate (temperature: 190° C., load: 2.16 kg) of from 5 to 600 g/10 min.

9. The fuel tank according to claim 1, wherein the modified polyethylene resin composition (Z) has the gasoline permeation rate through a sheet of 1 mm in thickness as measured at 65° C. of at most 40 mg/cm$^2$·24 hr, the full notch creep rupture time under 5.5 MPa as measured at 80° C. of at least 60 hours.

10. The fuel tank according to claim 1, wherein the welding material further comprises at most 150 parts by weight of other polyethylene resin (D) per 100 parts by weight in total of the modified polyethylene resin (X) and the unmodified polyethylene resin (Y) wherein a density of the other polyethylene resin (D) is from 0.911 to 0.940 g/cm$^3$.

11. A fuel tank attachment which comprises a layer of a welding material comprising a modified polyethylene resin composition (Z) comprising from 0.5 to 95 wt % of modified polyethylene resin (X) and from 5 to 99.5 wt % of unmodified polyethylene resin (Y), the modified polyethylene resin composition (Z) having a density of from 0.938 to 0.965 g/cm$^3$ and a melt flow rate (temperature: 190° C., load: 2.16 kg) of from 0.05 to 1.0 g/10 min, wherein the modified polyethylene resin (X) is a modified polyethylene resin having at least one monomer selected from the group consisting of an unsaturated carboxylic acid and derivatives thereof, grafted to a polyethylene resin (A) having a density of from 0.910 to 0.965 g/cm$^3$ and a melt flow rate (temperature: 190° C., load: 2.16 kg) of from 0.1 to 5.0 g/10 min, wherein a grafted amount of the at least one monomer selected from the group consisting of an unsaturated carboxylic acid and derivatives thereof is within a range of from 0.001 to 5.0 wt %;

the unmodified polyethylene resin (Y) is a polyethylene resin having a density of from 0.930 to 0.965 g/cm$^3$, a melt flow rate (temperature: 190° C., load: 2.16 kg) of from 0.01 to 5.0 g/10 min and a melt flow rate ratio (high load melt flow rate HL-MFR (temperature: 190° C., load: 21.6 kg)/melt flow rate MFR (temperature: 190° C., load: 2.16 kg)) of from 40 to 270; and the modified polyethylene resin composition (Z) has a gasoline permeation rate through a sheet of 1 mm in thickness as measured at 65° C. of at most 50 mg/cm$^2$·24 hr, and a full notch creep rupture time under 5.5 MPa as measured at 80° C. of at least 50 hours, and a layer of a barrier material.

12. The fuel tank attachment according to claim 11, wherein the unmodified polyethylene resin (Y) has a melt flow rate ratio (high load melt flow rate HL-MFR (temperature: 190° C., load: 21.6 kg)/melt flow rate MFR (temperature: 190° C., load: 2.16 kg)) of from 70 to 150.

13. The fuel tank attachment according to claim 11, wherein the unmodified polyethylene resin (Y) is a polyethylene resin composition comprising from 25 to 60 wt % of a polyethylene resin (B) having a density of from 0.910 to 0.940 g/cm$^3$ and a high load melt flow rate (temperature: 190° C., load: 21.6 kg) of from 0.05 to 10 g/10 min, and from 40 to 75 wt % of a polyethylene resin (C) having a density of from 0.940 to 0.970 g/cm$^3$ and a melt flow rate (temperature: 190° C., load: 2.16 kg) of from 5 to 600 g/10 min.

14. The fuel tank attachment according to claim 11, wherein the unmodified polyethylene resin (Y) is a polyethylene resin (Y) produced by multistage polymerization.

15. The fuel tank attachment according to claim 11, wherein the welding material further comprises at most 150 parts by weight of other polyethylene resin (D) per 100 parts by weight in total of the modified polyethylene resin (X) and the unmodified polyethylene resin (Y) wherein a density of the other polyethylene resin (D) is from 0.911 to 0.965 g/cm$^3$.

16. The fuel tank attachment according to claim 15, wherein at least one of the modified polyethylene resin (X), the unmodified polyethylene resin (Y) and said other polyethylene resin (D) is produced by a single-site catalyst.

17. The fuel tank attachment according to claim 11, wherein the unmodified polyethylene resin (Y) is a polyethylene resin composition comprising from 25 to 60 wt % of a polyethylene resin (B) having a density of from 0.910 to 0.927 g/cm$^3$ and a high load melt flow rate (temperature: 190° C., load: 21.6 kg) of from 0.05 to 10 g/10 min, and from 40 to 75 wt % of a polyethylene resin (C) having a density of from 0.940 to 0.970 g/cm$^3$ and a melt flow rate (temperature: 190° C., load: 2.16 kg) of from 5 to 600 g/10 min.

18. The fuel tank attachment according to claim 11, wherein the modified polyethylene resin composition (Z) has the gasoline permeation rate through a sheet of 1 mm in thickness as measured at 65° C. of at most 40 mg/cm$^2$·24 hr, the full notch creep rupture time under 5.5 MPa as measured at 80° C. of at least 60 hours.

19. The fuel tank attachment according to claim 11, wherein the welding material further comprises at most 150 parts by weight of other polyethylene resin (D) per 100 parts by weight in total of the modified polyethylene resin (X) and the unmodified polyethylene resin (Y) wherein a density of the other polyethylene resin (D) is from 0.911 to 0.940 g/cm$^3$.

\* \* \* \* \*